(12) United States Patent
Zhao et al.

(10) Patent No.: US 12,302,295 B2
(45) Date of Patent: May 13, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 415 days.

(21) Appl. No.: 17/852,237

(22) Filed: Jun. 28, 2022

(65) Prior Publication Data

US 2022/0330241 A1    Oct. 13, 2022

Related U.S. Application Data

(63) Continuation of application No. PCT/CN2020/070336, filed on Jan. 3, 2020.

(51) Int. Cl.
*H04W 72/25* (2023.01)
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC ..... H04W 72/25; H04W 72/40; H04W 72/20; H04W 72/0446
See application file for complete search history.

(56) References Cited

U.S. PATENT DOCUMENTS

2021/0144750 A1* 5/2021 Cao .................. H04W 72/0453
2021/0153168 A1* 5/2021 Sarkis ................... H04W 72/02
(Continued)

FOREIGN PATENT DOCUMENTS

CN    110214427 A    9/2019
CN    110311762 A    10/2019
(Continued)

OTHER PUBLICATIONS

Guangdong OPPO Mobile Telecommunications Corp. Ltd., International Search Report and Written Opinion, PCT/CN2020/070336, Oct. 10, 2020, 12 pgs.
(Continued)

*Primary Examiner* — Shukri Taha
(74) *Attorney, Agent, or Firm* — Morgan, Lewis & Bockius LLP

(57) ABSTRACT

A wireless communication method and a terminal device. The method comprises: a first terminal receives a sidelink data channel and/or a sidelink reference signal sent by a second terminal; the first terminal determines a resource pool configuration and/or a transmission resource of a first sidelink feedback channel, wherein the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1; and the first terminal sends the first sidelink feedback channel to the second terminal according to the resource pool configuration and/or the transmission resource of the first sidelink feedback channel.

17 Claims, 11 Drawing Sheets

(56) References Cited

U.S. PATENT DOCUMENTS

| | | | |
|---|---|---|---|
| 2022/0116916 A1* | 4/2022 | Zhao | H04W 72/0453 |
| 2022/0140958 A1 | 5/2022 | Zhou et al. | |
| 2022/0321306 A1* | 10/2022 | Wang | H04L 1/1864 |
| 2024/0334407 A1* | 10/2024 | Zhang | H04W 28/26 |

FOREIGN PATENT DOCUMENTS

| | | |
|---|---|---|
| CN | 110545534 A | 12/2019 |
| WO | WO2021134798 A1 | 7/2021 |

OTHER PUBLICATIONS

Apple, "On NR V2X Physical Layer Structure," 3GPP TSG RAN WG1 #99, R1-1912810, Reno, USA, Nov. 18-22, 2019, 15 pgs.

Intel Corporation, "Sidelink physical structure for NR V2X communication," 3GPP TSG RAN WG1 Meeting #99, R1-1913255/ revised R1-1912203, Reno, Nevada, USA, Nov. 18-22, 2019, 36 pgs.

Samsung, "On physical layer structures for NR V2X," 3GPP TSG RAN WG1 #99 Meeting, R1-1912458, Reno, USA, Nov. 18-22, 2019, 12 pgs.

Guangdong OPPO Mobile Telecommunications Corp. Ltd., EP20910949, Extended European Search Report, Nov. 18, 2022, 9 pgs.

* cited by examiner

WIRELESS COMMUNICATION METHOD AND TERMINAL DEVICE

CROSS-REFERENCE TO RELATED APPLICATIONS

This application is a continuation application of PCT Patent Application No. PCT/CN2020/070336, entitled "WIRELESS COMMUNICATION METHOD AND TERMINAL DEVICE" filed on Jan. 3, 2020, the disclosure of which is incorporated herein by reference in its entirety.

TECHNICAL FIELD

Embodiments of the present disclosure relate to the field of communication, and more particularly, to a wireless communication method and a terminal device.

BACKGROUND

An Internet of Vehicles system is a sidelink (SL) transmission technology based on Long Term Evaluation Device To Device (LTE D2D). The Internet of Vehicles system adopts a device to device direct communication mode, which is different from a mode in which communication data is received or transmitted through a base station in a traditional LTE system, and thus has higher spectrum efficiency and lower transmission delay.

In an Internet of Vehicles system, a sidelink feedback channel is introduced so as to improve transmission reliability. When sidelink feedback is activated, a receiver terminal can send sidelink feedback information to a transmitter terminal, so that the transmitter terminal can determines whether to perform retransmission according to the sidelink feedback information.

At present, considering that the Internet of Vehicles system supports multi-carrier sidelink transmission, there is a need for feedback information corresponding to a Physical Sidelink Shared Channel (PSSCH) on each carrier, or one PSSCH supports multi-Transport Block (TB) transmission, and there is a need for feedback information corresponding to each TB.

SUMMARY

Embodiments of the present disclosure provide a wireless communication method and a terminal device.

A first aspect provides a wireless communication method, including: receiving, by a first terminal, a sidelink data channel and/or a sidelink reference signal sent by a second terminal; determining, by the first terminal, a resource pool configuration and/or a transmission resource of a first sidelink feedback channel, wherein the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1; and sending, by the first terminal, the first sidelink feedback channel to the second terminal according to the resource pool configuration and/or the transmission resource of the first sidelink feedback channel.

A second aspect provides a wireless communication method, including: receiving, by a first terminal, at least one sidelink data channel sent by a second terminal; determining, by the first terminal from a plurality of sidelink feedback channel types, a target sidelink feedback channel type for transmission of sidelink feedback information of the at least one sidelink feedback channel, wherein the plurality of sidelink feedback channel types include a first-type sidelink feedback channel and a second-type sidelink feedback channel, the first-type sidelink feedback channel is used to carry 1-bit sidelink feedback information, and the second-type sidelink feedback channel is used to carry K-bit sidelink feedback information, where K is an integer greater than 1; and sending, by the first terminal, a sidelink feedback channel of the target sidelink feedback channel type to the second terminal.

A third aspect provides a terminal device, configured to perform the method in the first aspect or any of the possible implementations thereof. Specifically, the terminal device includes one or more units configured to perform the method in the first aspect or any of the possible implementations thereof.

A fourth aspect provides a terminal device, configured to perform the method in the second aspect or any of the possible implementations thereof. Specifically, the terminal device includes one or more units configured to perform the method in the second aspect or any of the possible implementations thereof.

A fifth aspect provides a terminal device, including a processor and a memory. The memory is configured to store a computer program, and the processor is configured to call and run the computer program stored in the memory to execute the method in the first aspect or any of the implementations thereof.

A sixth aspect provides a terminal device, including a processor and a memory. The memory is configured to store a computer program, and the processor is configured to call and run the computer program stored in the memory to execute the method in the second aspect or any of the implementations thereof.

A seventh aspect provides a chip, configured to perform the method in any one of the first to second aspects or any of the implementations thereof.

Specifically, the chip includes: a processor, configured to call and run a computer program from a memory, to cause a device installed with the chip to perform the method in any one of the first to second aspects or any of the implementations thereof.

An eighth aspect provides a computer-readable storage medium, configured to store a computer program that causes a computer to perform the method in any one of the first to second aspects or any of the implementations thereof.

A ninth aspect provides a computer program product, including computer program instructions, which cause a computer to perform the method in any one of the first to second aspects or any of the implementations thereof.

A tenth aspect provides a computer program which, when running on a computer, causes the computer to perform the method in any one of the first to second aspects or any of the implementations thereof.

DETAILED DESCRIPTION

Figure 1:
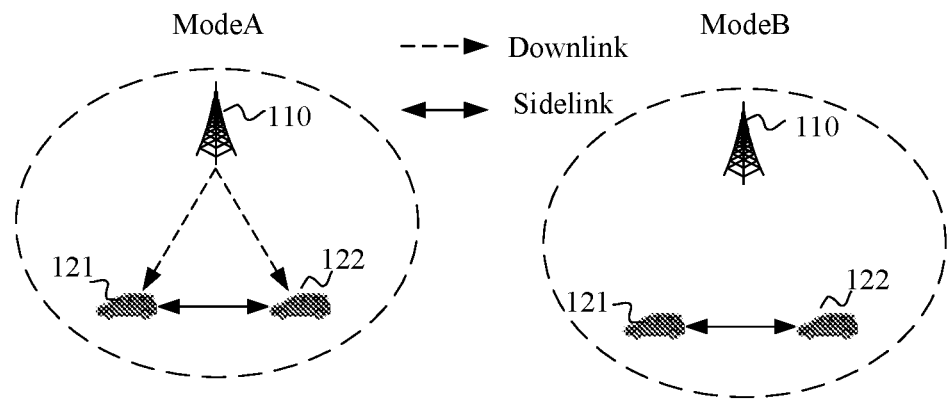
FIG. 1 is a schematic diagram of an application scenario provided by an embodiment of the present disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

It should be understood that the technical solutions of the embodiments of the present disclosure may be applied to a device to device (D2D) communication system, for example, an Internet of Vehicles system that performs D2D communication based on long term evolution (LTE), or a NR-V2X system. Unlike a traditional LTE system in which communication data between terminals is received or sent through a network device (for example, a base station), the Internet of Vehicles system uses a device to device direct communication mode, and thus has higher spectrum efficiency and lower transmission delay.

In some embodiments, the communication system on which the Internet of Vehicles system is based may be a Global System for Mobile communications (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a 5G new radio (NR) system, or the like.

The network device in the embodiments of the present disclosure may be a Base Transceiver Station (BTS) in a GSM system or a CDMA system, or may be a NodeB (NB) in a WCDMA system, or an Evolutional Node B (eNB or eNodeB) in a LTE system, or a wireless controller in a Cloud Radio Access Network (CRAN), or the network device may be a mobile switching center, a relay station, an access point, a vehicle-mounted device, a wearable device, a hub, a switch, a bridge, a router, a network side device (gNB) in the NR network, a network device in the future evolved Public Land Mobile Network (PLMN), or the like.

The terminal device in the embodiments of the present disclosure may be a terminal device that can implement D2D communication. For example, it may be a vehicle-mounted terminal device, or a terminal device in an LTE system (LTE UE), a terminal device in an NR network (NR UE), or a terminal device in a future evolved Public Land Mobile Network (PLMN), etc., which is not limited in the embodiments of the present disclosure.

D2D communication technologies can be applied to vehicle to vehicle (V2V) communication or vehicle to everything (V2X) communication. In the V2X communication, X can generally refer to any device with wireless receiving and sending capabilities, for example, but not limited to, a slowly-moving wireless device, a fast-moving vehicle-mounted device, or a network control node with wireless transmitting and receiving capabilities. It should be understood that the embodiments of the present disclosure are mainly applied to a V2X communication scenario, but can also be applied to any other D2D communication scenarios, which is not limited in the embodiments of the present disclosure.

FIG. 1 is a schematic diagram of an application scenario of an embodiment of the present disclosure. FIG. 1 exemplarily shows one network device and two terminal devices. In some embodiments, the wireless communication system in the embodiments of the present disclosure may include a plurality of network devices, and other numbers of terminal devices may be included in a coverage range of each network device, which is not limited by the embodiment of the present disclosure.

It should be understood that the terms "system" and "network" herein may often be used interchangeably herein. The term "and/or" herein is only an association relationship that describes associated objects, indicating that there may be three relationships. For example, A and/or B may indicate three cases where A exists alone, A and B exist simultaneously, and B exists alone. In addition, the character "/" herein generally indicates that the related objects before and after this character are in an "or" relationship.

In some embodiments, the wireless communication system may also include other network entities such as a mobile management entity (MME), a serving gateway (S-GW), and a packet data network gateway (P-GW). Alternatively, the wireless communication system may also include other network entities such as a session management function (SMF), unified data management (UDM), and an authentication server function (AUSF), which is not limited in the embodiments of the present disclosure.

In the Internet of Vehicles system, the terminal device can use mode A and mode B for communication.

Specifically, a terminal device 121 and a terminal device 122 may communicate with each other in a D2D communication mode. When performing the D2D communication, the terminal device 121 and the terminal device 122 directly communicate through a D2D link, that is, a sidelink (SL). In the mode A, transmission resources of the terminal device are allocated by the base station, and the terminal device can send the data on the SL according to the resources allocated by the base station. The base station can allocate resources for a single transmission for the terminal device, or can allocate resources for semi-static transmission for the terminal. In the mode B, the terminal device autonomously selects transmission resources from SL resources. Specifically, the terminal device obtains available transmission resources in a resource pool by means of sensing, or the terminal device randomly selects a transmission resource from the resource pool.

It should be understood that the above-mentioned mode A and mode B are merely illustrative of two transmission modes, and other transmission modes may be defined. For example, mode 1 and mode 2 are introduced in NR-V2X, where mode 1 indicates that the sidelink transmission resources of the terminal device are allocated by the base station, and manners for allocating the sidelink transmission resources by the base station through mode A and mode 1 may be different, for example, one is a dynamic scheduling manner, and the other is a semi-static scheduling manner or a semi-static scheduling combined with dynamic scheduling manner, and mode 2 indicates that the sidelink transmission resources of the terminal device are selected by the terminal device.

Figure 2:
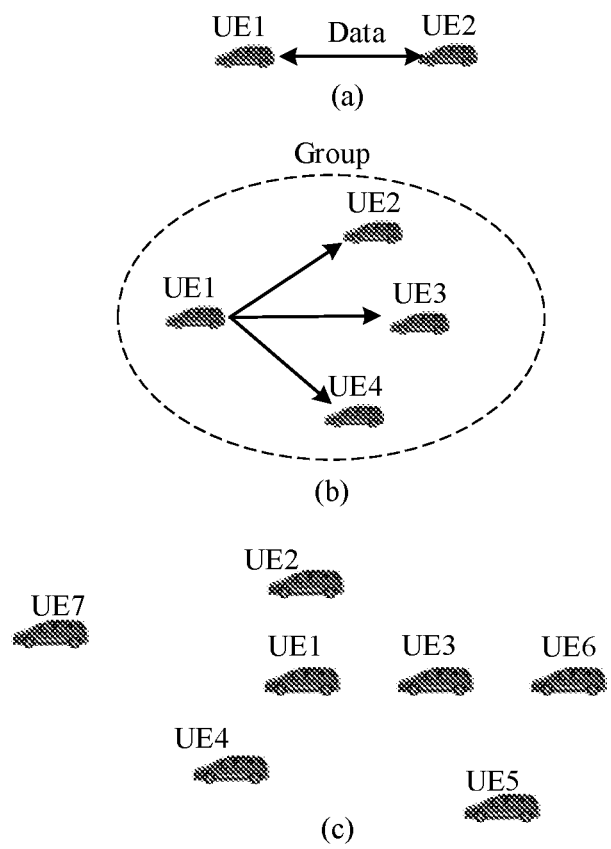
FIG. 2 is a schematic diagram of several communication modes between terminal devices.

In the New Radio (NR)-based Vehicle to Everything (V2X) system (NR-V2X for short), a plurality of transmission modes can be supported: a unicast transmission mode in which the receiver terminal is only one terminal, for example, the unicast transmission between UE1 and UE2 shown in (a) of FIG. 2; a multicast transmission mode in which the receiver terminals are all terminals in a communication group, or all terminals within a certain transmission distance, for example, UE1, UE2, UE3 and UE4 forming the communication group as shown in (b) of FIG. 2, where UE1 sends data, and other terminal devices in the communication group are the receiver terminals; and a broadcast transmission mode in which the receiver terminal can be any terminal, for example, UE1 is a transmitter terminal, and other terminals in the surrounding may all be the receiver terminals, as shown in (c) of FIG. 2.

In the NR-V2X system, in order to improve transmission reliability, a sidelink feedback channel, such as a Physical Sidelink Feedback Channel (PSFCH), is introduced. For the unicast transmission, a transmitter terminal sends sidelink data (including PSCCH and PSSCH) to a receiver terminal, and the receiver terminal can send Hybrid Automatic Repeat reQuest (HARQ) sidelink feedback information to the transmitter terminal. The transmitter terminal may determine whether it is necessary to perform retransmission according to the sidelink feedback information from the receiver terminal, where the HARQ sidelink feedback information may be carried in the sidelink feedback channel.

Figure 3:
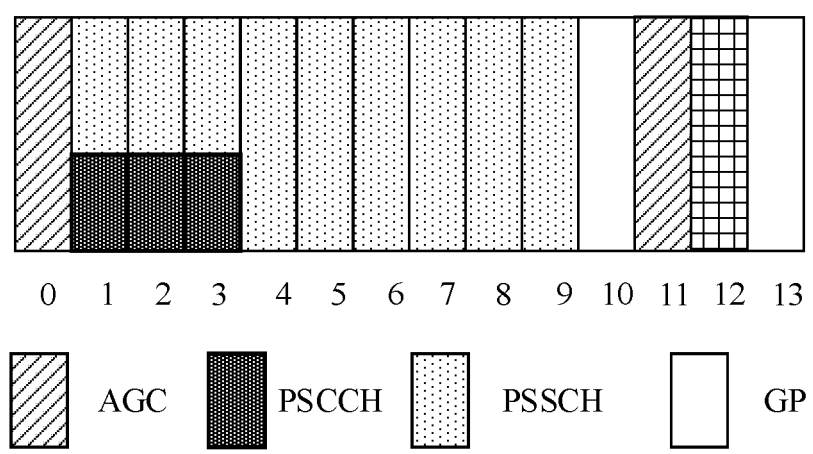
FIG. 3 is a schematic structural diagram of a PSFCH carrying 1-bit feedback information.

The PSFCH carries only 1-bit sidelink feedback information, and occupies two time-domain symbols in a time domain, the two time-domain symbols carry the same sidelink feedback information, and data on one time-domain symbol is the repetition of data on the other time-domain symbol. For example, a second time-domain symbol is used to carry the sidelink feedback information, data on a first symbol is a copy of the data on the second symbol, and the first symbol is used as Automatic Gain Control (AGC). The PSFCH occupies one Physical Resource Block (PRB) in a frequency domain. FIG. 3 shows an example of structures of PSFCH and Physical Sidelink Shared Channel (PSSCH)/Physical Sidelink Control Channel (PSCCH). Specifically, FIG. 3 illustrates positions of time-domain symbols occupied by PSFCH, PSCCH and PSSCH in one slot, where in one slot, the last symbol (that is, a time-domain symbol 13) can be used as a Guard Period (GP), the penultimate symbol (that is, a time-domain symbol 12) is used for PSFCH transmission, data on the third-to-last symbol is the same as data on the penultimate symbol, and the third-to-last symbol is used as AGC, the fourth-to-last symbol is also used as GP, a first symbol in the slot is used as AGC, and data on the first symbol is the same as data on a second symbol in the slot. The PSCCH occupies three time-domain symbols, that is, time-domain symbols 1, 2 and 3, and time-domain symbols 1 to 9 are used to transmit PSSCH. On the time-domain symbols 1, 2, and 3, PSCCH and PSSCH occupy different frequency domain resources.

It should be understood that the number and positions of time-domain symbols occupied by the PSCCH and the positions of the time-domain symbols occupied by the PSFCH shown in FIG. 3 are only examples, and the embodiments of the present disclosure are not limited thereto.

Figure 4:
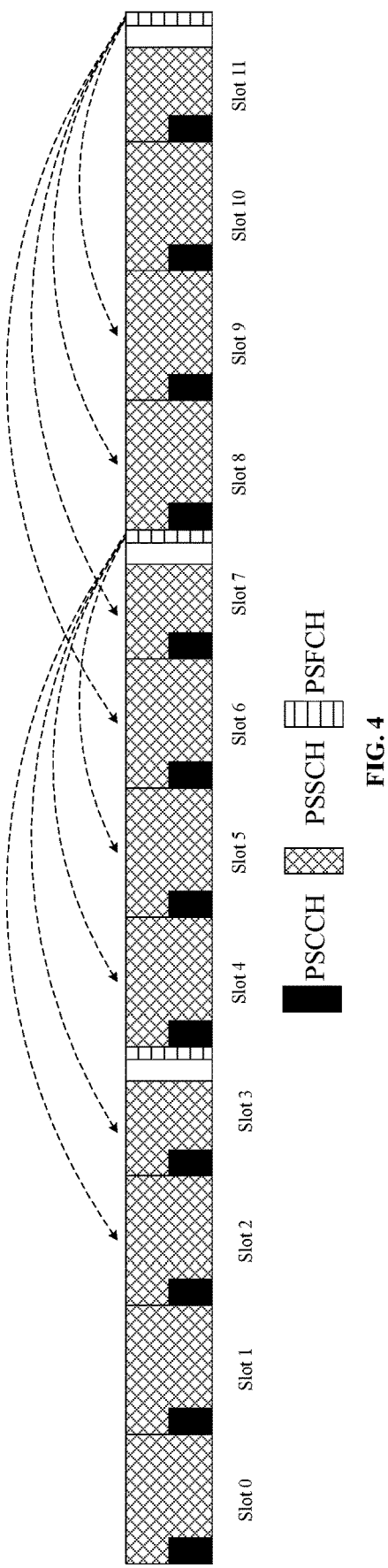
FIG. 4 is a schematic diagram of an example of sidelink feedback.

Further, in order to reduce the overhead of the PSFCH, it is defined that one slot in every N slots includes a PSFCH transmission resource, for example, N=1, 2, 4, where N can be pre-configured or configured by a network device. FIG. 4 is a schematic diagram of N=4, where sidelink feedback information corresponding to PSSCHs transmitted in slots 2, 3, 4, and 5 is transmitted in slot 7. Therefore, slots {2, 3, 4, 5} can be regarded as a slot set, and PSFCHs corresponding to PSSCHs transmitted in this slot set can be transmitted in the same slot.

In the following cases, multi-bit feedback information needs to be fed back, and the existing PSFCH design cannot meet transmission requirements.

Case 1: the PSSCH supports transmission of multiple Transport Blocks (TBs), and thus the PSFCH needs to transmit feedback information of multiple bits. For example, 4-layer or 8-layer PSSCH transmission is supported, corresponding to 2 TBs, and each TB needs corresponding feedback information. Accordingly, the PSFCH needs to transmit 2-bit feedback information.

Case 2: Code Block Group (CBG)-based feedback is supported. For example, one TB can be divided into multiple CBGs, and corresponding feedback information is required for each CBG. When the transmitter sends one TB, the receiver needs to feedback the feedback information for each of the multiple CBGs, which requires multiple bits.

Figure 5:
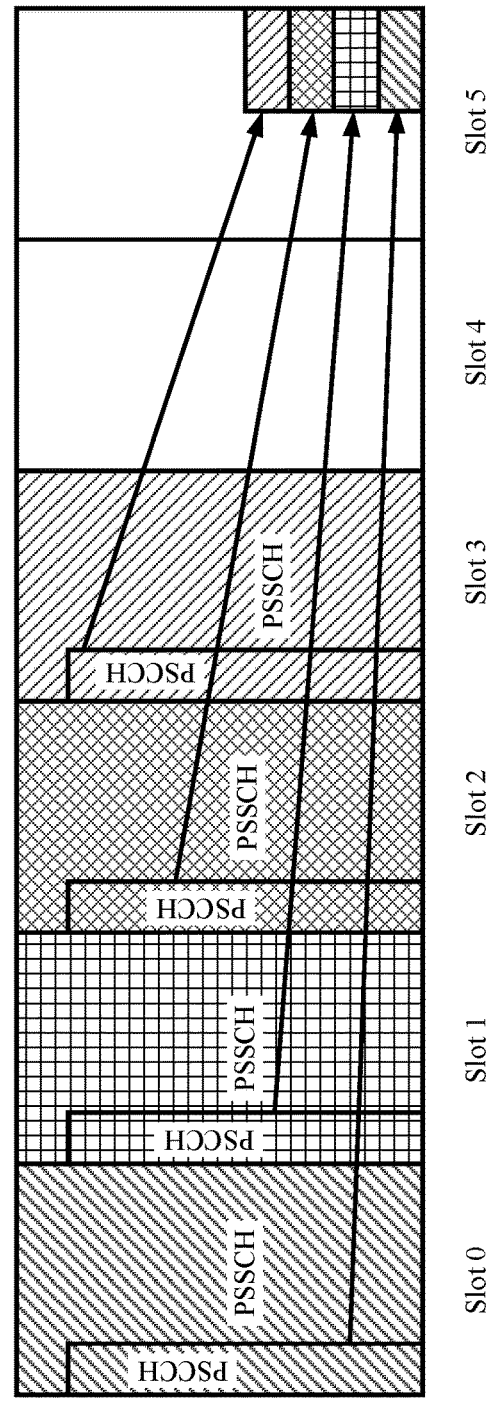
FIG. 5 is a schematic diagram of a correspondence between PSFCH transmission resources and PSSCH transmission resources.

Case 3: when a period N of the feedback channel is greater than 1, such as that shown in FIG. 5, the transmitter terminal can send the PSSCH to the receiver terminal in multiple slots, for example, the transmitter terminal sends PSSCHs to the receiver terminal in slot 0, slot 1 and slot 2, respectively, and the receiver terminal needs to send the feedback information corresponding to each of the PSSCHs, and thus the receiver terminal needs to send 3-bit feedback information in slot 5.

Case 4: simultaneous feedback of the HARQ feedback information and Channel State Information (CSI) is supported, and the HARQ feedback information and the CSI need to be multiplexed into one sidelink feedback channel for feedback, which requires the multi-bit feedback information.

Case 5: feedback of multiple carriers is supported. For example, if the transmitter terminal sends the PSSCHs on the multiple carriers, each of the PSSCHs needs corresponding feedback information. In order to reduce the overhead of feedback resources, the feedback information on the multiple carriers needs to be multiplexed into one sidelink feedback channel. Therefore, the sidelink feedback channel needs to carry the multi-bit feedback information.

In view of this, how to feedback the multi-bit feedback information to improve reliability of data transmission is an urgent problem to be solved.

Figure 6:
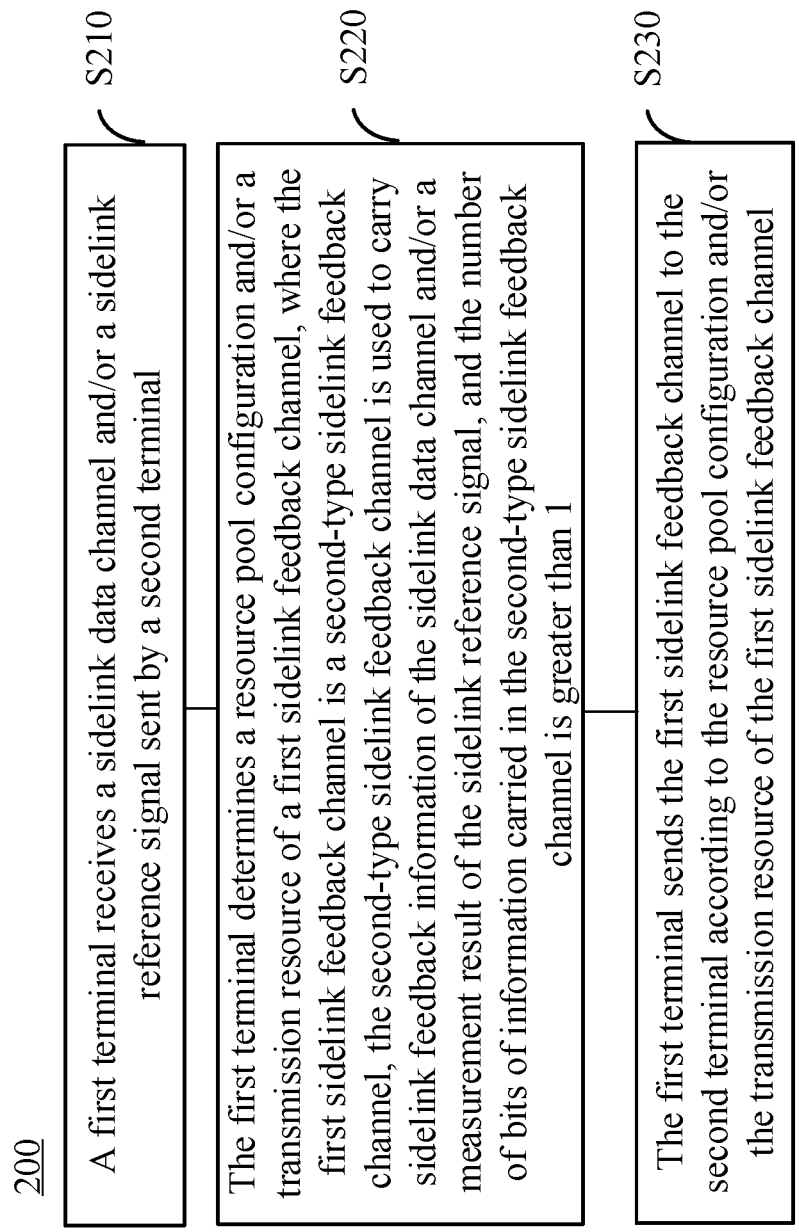
FIG. 6 is a schematic diagram of a wireless communication method provided by an embodiment of the present disclosure.

FIG. 6 is a schematic flowchart of a wireless communication method 200 provided by an embodiment of the present disclosure. The method 200 may be performed by the terminal device in the communication system shown in FIG. 1, and as shown in FIG. 6, the method 200 may include at least some of the following contents.

In S210, a first terminal receives a sidelink data channel and/or a sidelink reference signal sent by a second terminal.

In S220, the first terminal determines a resource pool configuration and/or a transmission resource of a first sidelink feedback channel, where the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1.

In S230, the first terminal sends the first sidelink feedback channel to the second terminal according to the resource pool configuration and/or the transmission resource of the first sidelink feedback channel.

For the convenience of distinguishing and description, in the embodiments of the present disclosure, a sidelink feedback channel used to carry 1-bit feedback information is referred to as a first-type sidelink feedback channel, and a sidelink feedback channel used to carry multi-bit feedback information is referred to as the second-type sidelink feedback channel.

It should be understood that, in the embodiments of the present disclosure, the second-type sidelink feedback channel is only illustrated in granularity of a slot in a time domain as an example. In other embodiments, the second-type sidelink feedback channel may also be designed in granularity of other time units, that is, the slot of the second-type sidelink feedback channel can also be replaced with other time units. Similarly, in a frequency domain, it is illustrated only in granularity of PRB, and in other embodiments, the second-type sidelink channel can also be designed in granularity of other frequency domain units, which is not detailed here for the sake of brevity.

In some embodiments, the sidelink reference signal in the embodiments of the present disclosure may include, for example, a Sidelink Synchronization Signal (SLSS), a Sidelink Synchronization Signal Block (S-SSB), a Sidelink Channel State Information Reference Signal (SL CSI-RS), a Demodulation Reference Signal (DMRS), a Sidelink Primary Synchronization Signal (S-PSS) and a Sidelink Secondary Synchronization Signal (S-SSS), etc. The sidelink synchronization signal includes S-PSS and S-SSS, and the demodulation reference signal includes PSSCH-DMRS, PSCCH DMRS and PSBCH DMRS.

In some embodiments, in some embodiments, in the time domain, the second-type sidelink feedback channel occupies all time-domain symbols in one slot that can be used for sidelink transmission.

In some embodiments, the last time-domain symbol in all the time-domain symbols that can be used for the sidelink transmission in one slot is not used to transmit the second-type sidelink feedback channel. For example, the last time-domain symbol is used as GP.

In some embodiments, a first time-domain symbol in all the time-domain symbols that can be used for the sidelink transmission in one slot is not used to transmit the second-type sidelink feedback channel. For example, the first time-domain symbol is used as AGC.

In some embodiments, data on the first time-domain symbol in all the time-domain symbols that can be used for the sidelink transmission in one slot is a duplication or copy of data on a second time-domain symbol used for the sidelink transmission in this slot, that is, the data on the first time-domain symbol and the second time-domain symbol that can be used for the sidelink transmission are the same.

Figure 7:
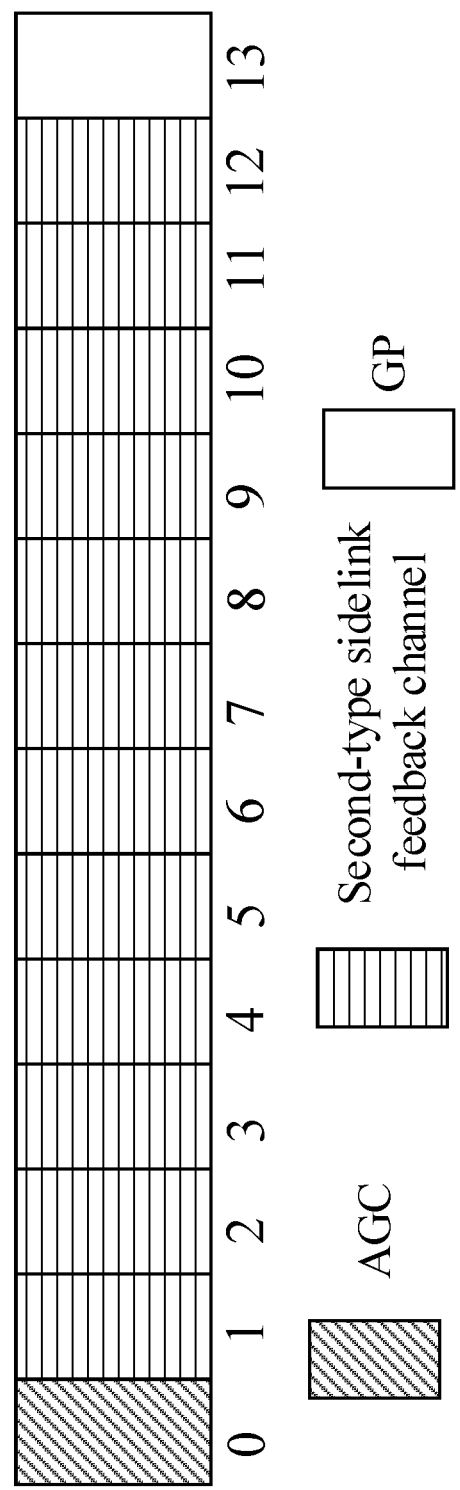
FIG. 7 is a schematic diagram of time-domain symbols occupied by a second-type PSFCH according to an embodiment of the present disclosure.

FIG. 7 is an example of a design of the second-type sidelink feedback channel, where the last time-domain symbol (i.e., symbol 13) in one slot is used as GP, and the first time domain symbol (i.e., symbol 0) is used as AGC, and data on the second time domain symbol (i.e., time-domain symbol 1) is a copy of data on the first time-domain symbol.

In some embodiments, in the frequency domain, the second-type sidelink feedback channel occupies M PRBs, where M is a positive integer, that is, the second-type sidelink feedback channel may occupy one or more PRBs in the frequency domain.

Therefore, in some implementations, the second-type sidelink feedback channel may occupy all the time domain symbols in one slot that can be used for the sidelink transmission in the time domain, and occupy one or more PRBs in the frequency domain.

In some other alternative implementations, the second-type sidelink feedback channel may occupy the second-to-last and the third-to-last time domain symbols in all the time domain symbols that can be used for the sidelink transmission in one slot in the time domain, and occupy N PRBs in the frequency domain, where N is an integer greater than 1, that is, the multi-bit feedback information can be transmitted by occupying the multiple PRBs in the frequency domain.

It should be understood that the embodiments of the present disclosure may be applicable to various scenarios where the multi-bit feedback information needs to be fed back.

As an exemplary scenario, the first terminal may receive the sidelink data channel sent by the second terminal, and feedback of the sidelink data channel requires multiple bits. It should be understood that the embodiments of the present disclosure do not specifically limit the number of sidelink data channels sent by the second terminal and received by the first terminal.

In some embodiments, the multi-bit feedback information may be feedback for multiple TBs transmitted in one sidelink data channel (e.g., the foregoing case 1), or may be feedback for multiple CBGs of one TB in the sidelink data channel (e.g., the foregoing case 2), or may be feedback for sidelink data channels transmitted in multiple slots (e.g., the foregoing case 3), or may be feedback for sidelink data channels transmitted in multiple carriers (e.g., the foregoing case 5).

As another exemplary scenario, the first terminal may receive the sidelink reference signal sent by the second terminal, and feedback of the measurement result of the sidelink reference signal requires multiple bits.

As still another exemplary scenario, the first terminal may receive the sidelink data channel and the sidelink reference signal sent by the second terminal, and combined feedback of the feedback information of the sidelink data channel and the measurement result of the sidelink reference signal requires multiple bits, for example, the foregoing case 4.

In the embodiments of the present disclosure, the feedback in the first exemplary scenario is described by way of example, and the implementations in other scenarios are similar, which are not repeated here for brevity.

In the embodiments of the present disclosure, the second-type sidelink feedback channel introduced for the feedback of the multi-bit feedback information may correspond to a corresponding resource pool configuration, and the resource pool configuration may be used for the receiver terminal, that is, the first terminal, to determine a transmission resource for transmission of the sidelink feedback channel according to the resource pool configuration, and further, to transmit the sidelink feedback channel on the transmission resource.

Hereinafter, in conjunction with the embodiments, manners for determining the resource pool configuration of the second-type sidelink feedback channel will be described.

Embodiment 1

In some embodiments, the resource pool can be configured according to a sidelink feedback channel type, and the first-type sidelink feedback channel and the second-type sidelink feedback channel may correspond to respective resource pool configurations, respectively. The first sidelink feedback channel is used to carry the multi-bit feedback information, that is, the first sidelink feedback channel belongs to the second-type sidelink feedback channel, and then for the first sidelink feedback channel, a transmission resource for transmission of the first sidelink feedback channel can be determined from the resource pool configuration of the second-type sidelink feedback channel. Accordingly, the resource pool configuration of the second-type sidelink feedback channel may be referred to as a resource pool configuration of the first sidelink feedback channel.

Embodiment 1-1: the first terminal may determine the resource pool configuration of the second-type sidelink feedback channel according to pre-configured information, configured information by the network device, or configured information by a group header terminal.

That is, the resource pool of the second-type sidelink feedback channel may be pre-configured, configured by the network device, or configured by the group header terminal.

The group header terminal may refer to a terminal with functions of resource management, resource allocation, resource scheduling, resource coordination or the like in a communication group of multicast communication, such as a first vehicle in the fleet formation driving or a vehicle in the middle of the fleet. The group header terminal may configure the resource pool configuration used for sending the PSFCH in the communication within the communication group.

In some embodiments, the resource pool configuration of the second-type sidelink feedback channel may be used to determine at least one of a frequency domain resource of the resource pool of the first sidelink feedback channel, a time domain resource of the resource pool of the first sidelink feedback channel, and the frequency domain resource of the first sidelink feedback channel and the time domain resource of the first sidelink feedback channel, so that the first terminal determines the transmission resource of the first sidelink feedback channel according to these information, and performs transmission of the first sidelink feedback channel.

In some embodiments, the resource pool configuration of the second-type sidelink feedback channel is specifically used to determine at least one of the following:

1. a frequency domain starting position of the resource pool of the second-type sidelink feedback channel;

As an example, the frequency domain starting position of the resource pool of the second-type sidelink feedback channel may be indicated by a PRB index or a sub-band index.

2. a frequency domain resource size of the resource pool of the second-type sidelink feedback channel;

As an example, the frequency domain resource size of the resource pool of the second-type sidelink feedback channel is indicated by the number of occupied PRBs or the number of occupied sub-bands. For example, if one PSFCH occupies P PRBs, and the number of PSFCHs that can be transmitted in the resource pool is Q, then the frequency domain resource size of the resource pool of the second-type sidelink feedback channel is P*Q PRBs. For another example, if the size of the sub-band is P, that is, one PSFCH occupies one sub-band, then the resource pool configuration information is used to configure the number Q of sub-bands, that is, the frequency domain resource size of the resource pool can be determined through parameters P and Q.

As an implementation, the frequency domain resource of the resource pool of the second-type sidelink feedback channel may be determined through a first bitmap, where each bit in the first bitmap corresponds to one PRB or one sub-band, and each bit is used to indicate whether the corresponding PRB or sub-band is the frequency domain resource of the resource pool of the second-type sidelink feedback channel. For example, the total number of PRBs is K, the first bit map has K bits, and each bit with a value of 1 indicates that the corresponding PRB belongs to the frequency domain resource of the resource pool of the second-type sidelink feedback channel, then the number of bits with the value of 1 in the first bitmap indicates the number of PRBs occupied by the resource pool.

3. the number L of Physical Resource Blocks (PRBs) occupied by the second-type sidelink feedback channel;

In some embodiments, the resource pool configuration information is used to indicate the number L of PRBs occupied by one second-type PSFCH in the frequency domain.

In some embodiments, the parameter L may be configured for each resource pool, that is, different resource pools may be configured with different parameters L.

4. a slot position of the resource pool of the second-type sidelink feedback channel;

As an implementation, the slot position of the resource pool of the second-type sidelink feedback channel may be determined through a second bitmap, where each bit in the second bitmap corresponds to one slot, and each bit is used to indicate whether the corresponding slot is a slot position available for transmission of the second-type sidelink feedback channel or not. For example, the total number of slots is K, the second bit map has K bits, and each bit with a value of 1 indicates that the corresponding slot is a slot of the resource pool of the second-type sidelink feedback channel, then a slot position corresponding to the bit with the value of 1 in the second bitmap represents a slot position occupied by the resource pool. For another example, the second bitmap includes K bits, which respectively correspond to K slots, and the second bitmap is periodically repeated within a Direct Frame Number (DFN) period, and is used to indicate information of the slot, that can be used for the resource pool, in a system frame number period. As an example, one DFN period includes 1024 radio frames, and each radio frame is 10 milliseconds.

5. a starting time-domain symbol in each slot that can be used to transmit the second-type sidelink feedback channel;

6. the number or length of time-domain symbols in each slot that can be used to transmit the second-type sidelink feedback channel.

It should be understood that, in some embodiments, the resource pool configuration of the first sidelink feedback channel may directly include at least one piece of the foregoing information, for example, the resource pool configuration may include the position information of the slots occupied by the second-type sidelink feedback channel. Alternatively, in some other embodiments, the resource pool configuration of the first sidelink feedback channel may also include other information used for determining at least one piece of the above information, for example, the resource pool configuration may include the second bitmap, and the positions of the slots that can be used to transmit the second-type sidelink feedback channel may be determined according to the second bitmap. The embodiments of the present disclosure do not limit the specific content of the resource pool configuration.

Figure 8:
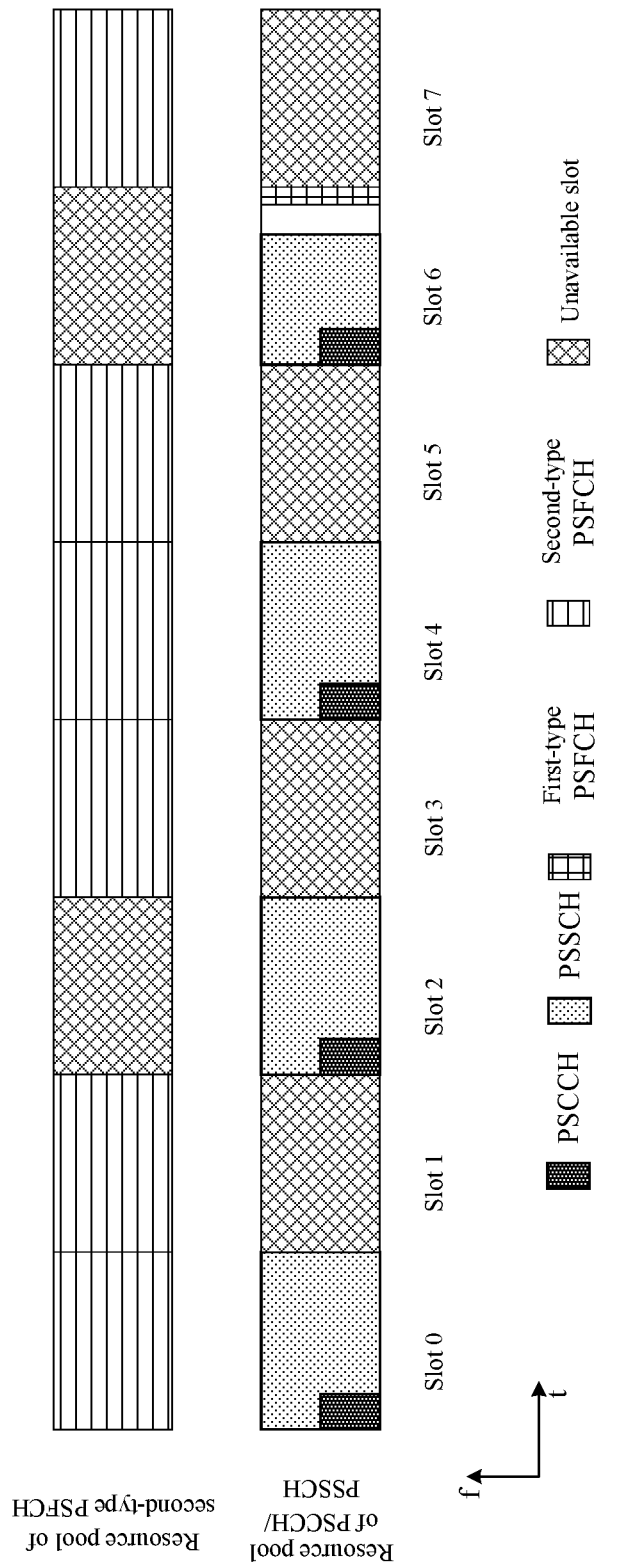
FIG. 8 is a schematic diagram of an example of a resource pool configuration of PSSCH and a resource pool configuration of a second-type PSFCH.

In a specific embodiment, the network device separately configures the resource pool of the PSSCH and the resource pool of the second-type PSFCH, that is, the configurations of the two resource pools are independent of each other. As shown in FIG. 8, available slots in the configured resource pool of the PSSCH include slot 0, slot 2, slot 4 and slot 6, and available slots in the configured resource pool of the second-type PSFCH include slot 0, slot 1, slot 3, slot 4, slot 5 and slot 7. In addition, the network device may also configure information such as the positions and length of time domain symbols that can transmit the second-type PSFCH in each slot that is available for transmission of the second-type PSFCH, a frequency domain starting position and length of the second-type PSFCH resource pool, and the number of PRBs occupied by each second-type PSFCH.

Embodiment 1-2: a resource pool configuration of the corresponding first sidelink feedback channel is determined according to the resource pool configuration of the sidelink data channel.

In this embodiment, the resource pool configuration of the sidelink data channel is associated with the resource pool configuration of the sidelink feedback channel corresponding to the sidelink data channel, and the sidelink feedback channel corresponding to the sidelink data channel sent in the resource pool of the sidelink data channel is transmitted in the resource pool of the sidelink feedback channel.

Figure 10:
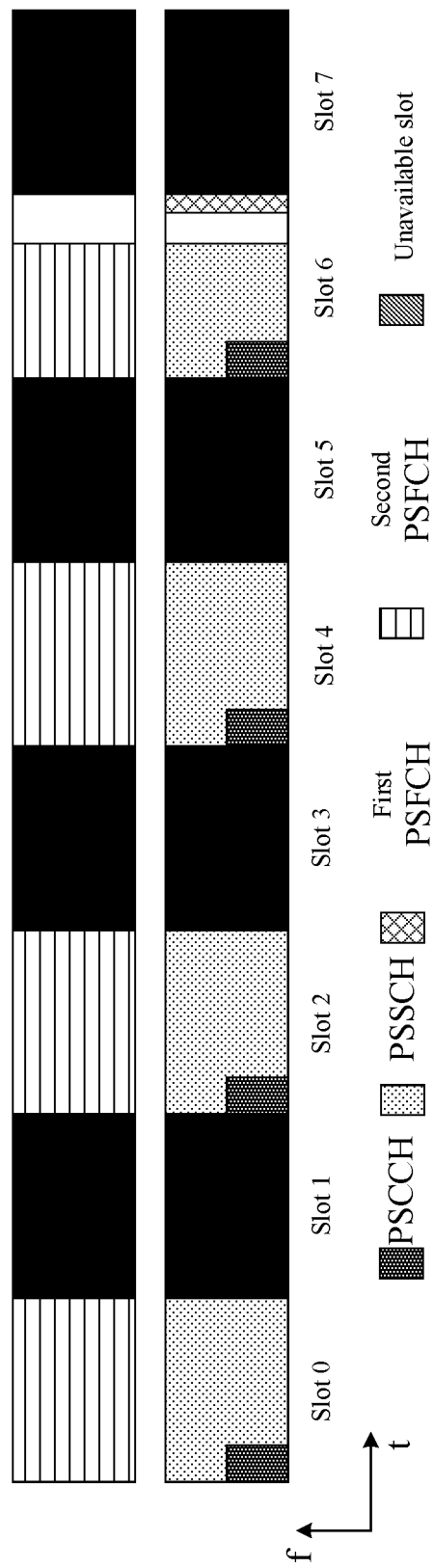
FIG. 10 is a schematic diagram of another example of a resource pool configuration of PSSCH and a resource pool configuration of a second-type PSFCH.

In some embodiments, the slots occupied by the resource pool of the first sidelink feedback channel are the same as the slots occupied by the resource pool of the corresponding sidelink data channel. For example, as shown in FIG. 10, the available slots in the resource pool of the PSSCH include slot 0, slot 2, slot 4 and slot 6, then it can be determined that the available slots in the resource pool of the second-type PSFCH also include slot 0, slot 2, slot 4 and slot 6.

In some embodiments, the resource pool of the first sidelink feedback channel and the resource pool of the corresponding sidelink data channel are frequency division multiplexed, that is, a frequency domain resource of the resource pool of the first sidelink feedback channel is different from a frequency domain resource of the resource pool of the corresponding sidelink data channel.

Figure 9:
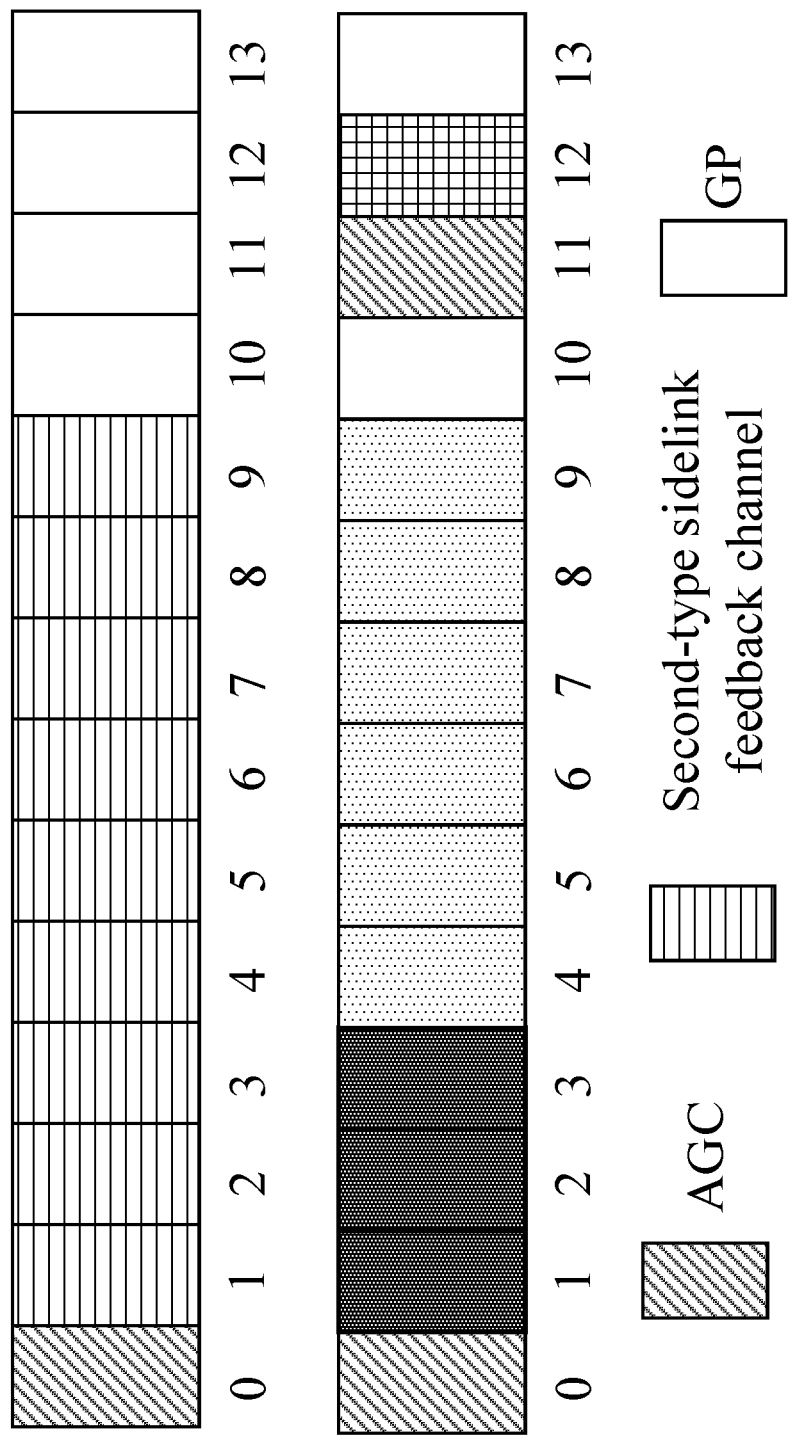
FIG. 9 is a schematic diagram of time-domain symbols occupied by a second-type PSFCH and a first-type PSFCH.

In some embodiments, if a slot includes one or more time domain symbol for transmitting the first-type sidelink feedback channel, the time domain symbols for transmitting the first sidelink feedback channel do not include a time domain symbol for transmitting the first-type sidelink feedback channel. As shown in FIG. 9, time domain symbols 11 and 12 in one slot are used to transmit the first-type PSFCH, then the second-type PSFCH in this slot does not occupy the time domain symbols 11 and 12, and one time domain symbol before the first-type PSFCH (that is, a time domain symbol 10) is used as GP, and thus this time domain symbol 10 is not used for transmission of the second-type PSFCH.

In some embodiments, the frequency domain starting position of the resource pool of the first sidelink feedback channel is determined according to a frequency domain starting position of the resource pool of the sidelink data channel or the sidelink control channel.

In some embodiments, the frequency domain resource size of the resource pool of the first sidelink feedback channel is determined according to the number of sub-bands in the resource pool of the sidelink data channel.

Specifically, there is a correspondence between the resource pool of the PSFCH and the resource pool of the PSSCH, and a parameter in the resource pool of the PSFCH can be determined according to a parameter of the resource pool of the PSSCH.

For example, if the resource pool of the PSSCH includes A sub-bands, one sub-band includes multiple consecutive PRBs, the number of PRBs occupied by one second-type PSFCH is P, then the number of PRBs included in the resource pool of the second-type PSFCH is greater than or equal to A*P, if one second-type PSFCH channel can carry the PSFCH of only one terminal, that is, the code division multiplexing of PSFCHs of multiple terminals is not supported.

For another example, if one second-type PSFCH can carry the PSFCHs of B terminals, for example, the PSFCHs of the B terminals can be multiplexed in a frequency domain resource of one PSFCH by means of code division multiplexing, then the number of PRBs included in the second-type PSFCH is greater than or equal to ceil (A*P/B), where ceil( ) represents rounding up.

In some embodiments, the slot position occupied by the first sidelink feedback channel is determined by the slot position of the corresponding sidelink data channel. As an example, there is a fixed offset between the slot position occupied by the first sidelink feedback channel and the slot position of the corresponding sidelink data channel. For example, when the network configures a slot offset between the first sidelink feedback channel and the corresponding PSSCH as S slots, and the PSSCH is received in slot n, the first sidelink feedback channel corresponding to the PSSCH is transmitted in slot n+S.

In some embodiments, the time domain symbols for transmitting the first sidelink feedback channel in one slot is the same as the time domain symbols of the sidelink data channel transmitted in the one slot. For example, time domain symbols occupied by the PSSCH received by the first terminal in one slot are time domain symbols 0 to 9, it can be determined that the time domain symbols of the first sidelink feedback channel transmitted in the one slot are also time domain symbols 0 to 9. It should be understood that it requires a certain processing time for decoding the PSSCH and generating the feedback information, and the second-type PSFCH transmitted in one slot is not the sidelink feedback channel corresponding to the PSSCH transmitted in the one slot.

The manners for determining the resource pool configuration of the second-type sidelink feedback channel have been described above with reference to Embodiment 1. For example, the resource pool configuration may be pre-configured, configured by the network device or configured by the group header terminal, or may also be determined according to the resource pool configuration of the sidelink data channel. The associated relationship between the resource pool of the sidelink data channel and the second-type sidelink feedback channel may be pre-configured, configured by the network device, or configured by the group header terminal, which is not limited in the embodiments of the present disclosure.

Hereinafter, in conjunction with Embodiment 2, the manners for determining the transmission resource of the first sidelink feedback channel will be described.

It should be understood that, in Embodiment 2, the transmission resource of the first sidelink feedback channel is determined according to the resource pool configuration of the second-type sidelink feedback channel. The resource pool configuration of the second-type sidelink feedback channel may be determined according to the foregoing Embodiment 1, or may also be determined in other manners, which is not limited in the embodiments of the present disclosure, that is, the Embodiment 1 and Embodiment 2 may be implemented independently, or may also be implemented in combination.

Embodiment 2-1, the first terminal determines the transmission resource of the first sidelink feedback channel in the resource pool of the first sidelink feedback channel according to first Sidelink Control Information (SCI) sent by the second terminal.

Specifically, the second terminal may send the PSSCH to the first terminal, and the SCI associated with the PSSCH may carry indication information, which is used for the first terminal to determine the transmission resource for transmitting the sidelink feedback information.

In some embodiments, the first SCI may be a second-order SCI, that is, an SCI format 0-2.

In some embodiments, the first SCI includes first indication information and/or second indication information, the first indication information is used to determine the slot position of the first sidelink feedback channel, and the second indication information is used to determine the frequency domain position of the first sidelink feedback channel.

As an embodiment, the first indication information is used to indicate a slot offset, and the slot offset is a slot offset of the first sidelink feedback channel with respect to a slot where the first SCI is located or a slot where the sidelink data channel is located. Therefore, the first terminal may determine a slot for transmitting the first sidelink feedback channel according to the slot in which the SCI or PSSCH is received, in combination with the slot offset.

In some specific embodiments, the slot offset may be calculated based on a logical slot or based on a physical slot. The logical slot refers to calculation according to slots included in one resource pool, and the calculation of the physical slot is irrelevant to the resource pool and is calculated according to a physical time.

For example, in FIG. 8, the slot offset between slot 0 and slot 4 is calculated as 2 slots according to the logical slot; if the calculation is based on the physical slot, the slot offset is 4 slots. If the slot offset carried in the SCI is calculated according to the physical slot, the slot for transmitting the second-type PSFCH is a first slot that can be used to transmit the second-type PSFCH after slot n+k, where n represents a slot where the SCI is located, and k represents the slot offset.

As an example, if the SCI is received at slot 0, and the slot offset carried by the SCI is 3 slots and is calculated according to the physical slot, then the slot for transmitting the second-type PSFCH is slot 4. If the slot offset is calculated based on the logical slot, the slot for transmitting the second-type PSFCH is slot 6.

As another embodiment, the first indication information is used to indicate an index value, and the slot offset between the first sidelink feedback channel and the first SCI or the sidelink data channel is determined according to the index value. There is a correspondence between the index value and the slot offset.

For example, the network device may configure a table, i.e., the correspondence, for the first terminal. The table indicates a relationship between the index value and its corresponding slot offset, and one index value is indicated by the SCI, so that the first terminal can determine the corresponding slot offset according to the index value indicated by the SCI.

In some embodiments, the second indication information is used to indicate an index value which is an index of a target frequency domain position in multiple frequency domain positions in the resource pool of the first sidelink feedback channel.

For example, in the resource pool of the second-type PSFCH, the number of positions that can be used to transmit the second-type PSFCH in one slot is C, which corresponds to indexes 0, 1, 2 . . . C−1, respectively, and the second indication information carried in the SCI is used to indicate one index value c, c=0, 1, 2 . . . C−1, and the target frequency domain position of the second-type PSFCH can be determined according to the index value.

For another example, the resource pool of the second-type PSFCH includes D PRBs, corresponding to indexes 0, 1, 2 . . . D−1, respectively, and the second indication information carried in the SCI is used to indicate one index value d, d=0, 1, 2 . . . D−1, the frequency domain position of the second-type PSFCH can be determined according to the index value.

Embodiment 2-2: the first terminal determines the transmission resource of the first sidelink feedback channel in the resource pool of the first sidelink feedback channel according to the transmission resource of the sidelink data channel.

In some embodiments, the first terminal may determine the transmission resource of the first sidelink feedback channel according to the frequency domain position and slot position of the sidelink data channel or the sidelink control channel.

For example, the first terminal determines the frequency domain position of the first sidelink feedback channel according to the frequency domain position of the sidelink data channel.

For another example, the first terminal determines the slot position of the first sidelink feedback channel according to the slot position of the sidelink data channel.

For still another example, the first terminal determines the time domain, frequency domain and/or code domain resources of the PSFCH according to the time domain position and the frequency domain position of the PSSCH.

As an example, the first terminal may determine the slot position of the first sidelink feedback channel according to the slot position of the sidelink data channel and a slot spacing, and the slot spacing is an interval of a slot for transmitting the first sidelink feedback channel with respect to a slot for transmitting the sidelink data channel or sidelink control channel. For example, the slot spacing is 2.

In some embodiments, the slot spacing may be related to a subcarrier spacing (SCS) of a carrier or Bandwidth Part (BWP) where the resource pool of the first sidelink feedback channel is located, that is, different SCSs may correspond to respective slot spacings. For example, when SCS=15 kHz, K=2, and when SCS=30 kHz, K=4.

In some embodiments, the slot spacing is pre-configured, or configured by the network device, or configured by the group header terminal. For example, the slot spacing may be included in the resource pool configuration information of the first sidelink feedback channel.

As another example, the first terminal may determine the frequency domain position of the first sidelink feedback channel according to the frequency domain position of the sidelink data channel and a first correspondence. The first correspondence is a correspondence between the frequency domain position of the sidelink feedback channel in the resource pool of the first sidelink feedback channel and the frequency domain position of the sidelink data channel in the resource pool of the sidelink data channel.

In some embodiments, the feedback information of the sidelink data channel may be at least one of the following:
Hybrid Automatic Repeat reQuest-ACKnowledgement (HARQ-ACK);
Channel Quality Indicator (CQI);
Rank Indication (RI); and
Precoding Matrix Indicator (PMI).

In some embodiments, the measurement result of the sidelink reference signal may include index information for determining a beam.

As an example, the index information for determining the beam may be index information of a Channel State Information Reference Signal (CSI-RS).

Specifically, the transmitter terminal may transmit data in a beamforming manner to improve the reliability of data transmission and transmission distance, and the receiver terminal may fed back index information of an optimal beam to the transmitter terminal. Specifically, a beam can be determined through a CSI-RS resource corresponding to the beam, and thus the index information of the CSI-RS resource is fed back to the transmitter terminal, so that the receiver terminal can determine the optimal beam selected by the transmitter terminal according to the index information of the CSI-RS resource.

In some scenarios where there are multiple sidelink feedback channel types, for example, the aforementioned first-type sidelink feedback channel and second-type sidelink feedback channel, how to select the feedback channel type is also an urgent problem to be solved.

Accordingly, the embodiments of the present disclosure provide another wireless communication method, which can determine which type of sidelink feedback channel is used for feedback, so as to improve system performance.

Figure 11:
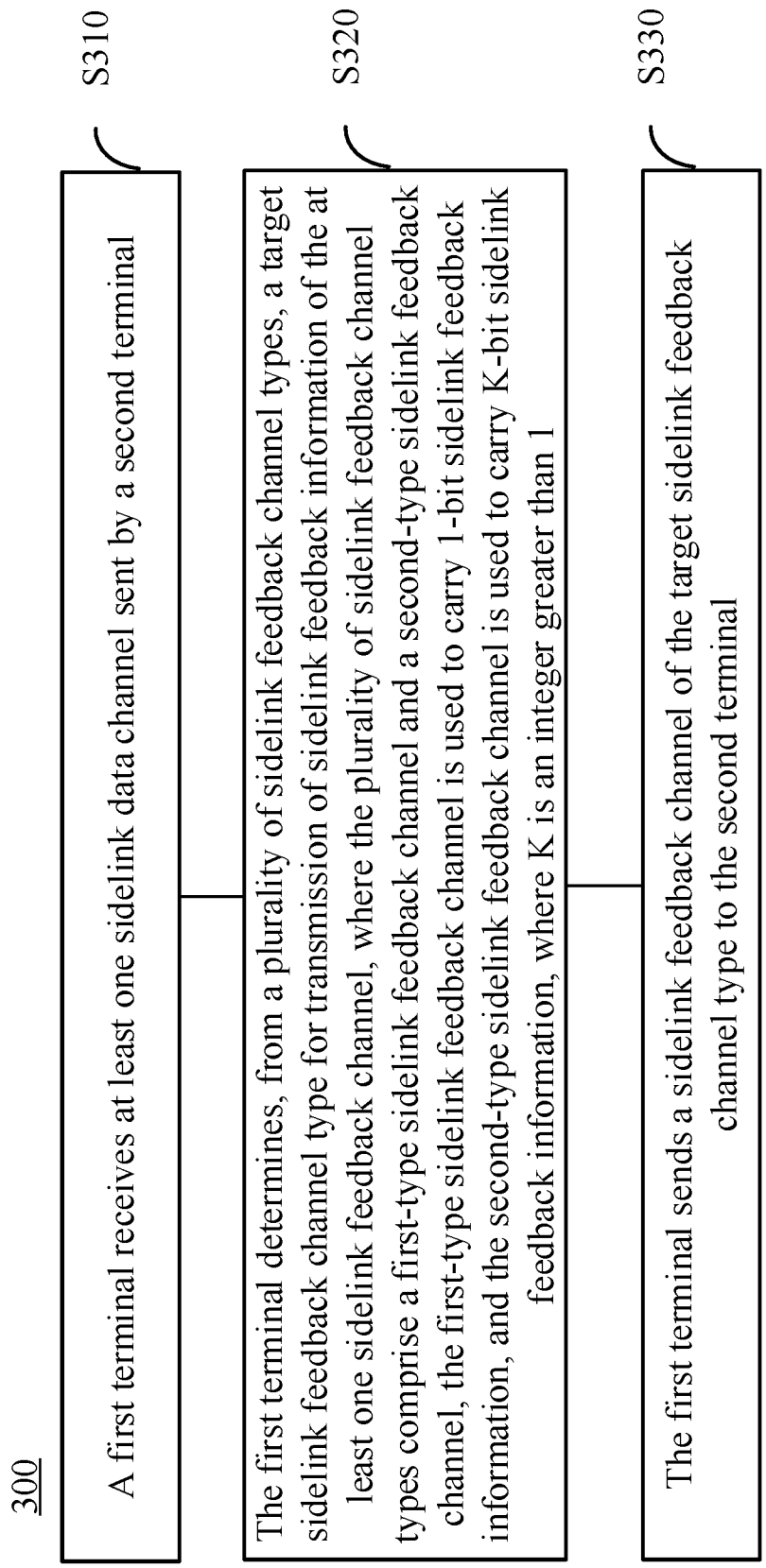
FIG. 11 is a schematic diagram of another wireless communication method provided by an embodiment of the present disclosure.

FIG. 11 is a schematic flowchart of a wireless communication method 300 according to another embodiment of the present disclosure. The method 300 may be executed by the terminal device in the communication system shown in FIG. 1. As shown in FIG. 11, the method 300 includes the following content.

In S310, a first terminal receives at least one sidelink data channel sent by a second terminal.

In S320, the first terminal determines a target sidelink feedback channel type for transmitting sidelink feedback information of the at least one sidelink feedback channel from a plurality of sidelink feedback channel types, where the plurality of sidelink feedback channel types include a first-type sidelink feedback channel and a second-type sidelink feedback channel, the first-type sidelink feedback channel is used to carry 1-bit sidelink feedback information, and the second-type sidelink feedback channel is used to carry K-bit sidelink feedback information, where K is an integer greater than 1.

It should be understood that the plurality of sidelink feedback channel types may include the first-type sidelink feedback channel and the second-type sidelink feedback channel, or may include more sidelink feedback channel types. For the specific description of the first-type sidelink feedback channel and the second-type sidelink feedback channel, reference can be made to the related description of the embodiment shown in FIG. 6, which is not repeated here for the sake of brevity.

It should be noted that though the embodiments of the present disclosure are described only in the examples where the sidelink feedback channel type of the at least one sidelink data channel is determined, the embodiments of the present disclosure are also applicable to the situations where the first terminal receives at least one sidelink reference signal of the second terminal, and further determines a feedback channel type for the at least one sidelink reference signal, or is also applicable to the situations where the first terminal receives at least one sidelink data channel and at least one sidelink reference signal of the second terminal, and further determines the feedback channel types for the at least one sidelink data channel and the at least one sidelink reference signal, and the specific implementations are similar, which are not repeated here for the sake of brevity.

In some embodiments, in some embodiments, each sidelink data channel in the at least one sidelink data channel needs only 1-bit feedback information, or, in some other embodiments, the at least one sidelink data channel may be the sidelink data channel as described in the foregoing cases 1 to 5, that is, it requires the multi-bit feedback information, which is not limited in the embodiments of the present disclosure.

In the embodiments of the present disclosure, after receiving the at least one sidelink data channel sent by the second terminal, the first terminal may determine the type of the sidelink feedback channel corresponding to the at least one sidelink data channel, and may further perform sidelink feedback based on the sidelink feedback channel type. For example, if it is determined to use the first-type sidelink feedback channel, the terminal device may send at least one first-type sidelink feedback channel to carry sidelink feedback information for each of the at least one sidelink data channel. Alternatively, if it is determined to use the second-type sidelink feedback channel, the terminal device may send one second-type sidelink feedback channel to carry the sidelink feedback information for each of the at least one sidelink data channel.

In some embodiments, in some embodiments, the S320 may specifically include:
determining, by the first terminal, the target sidelink feedback channel type according to at least one of the number of bits of information to be fed back, the resource pool configuration and first information, where the first information is used to indicate a type of the sidelink feedback channel for transmitting the sidelink feedback information.

As an embodiment, the first terminal may determine a sidelink feedback channel type indicated by the first information as the target sidelink feedback channel type.

In some embodiments, the first information is sent by the second terminal to the first terminal; or
the first information is sent by a network device to the first terminal; or
the first information is sent by a group header terminal to the first terminal.

In some embodiments, the second terminal sends the first information to the first terminal through sidelink control information (SCI) or PC5-RRC signaling. For example, when the second terminal sends the at least one sidelink data channel to the first terminal, the first information may be included in the SCI associated with the sidelink data channel, indicating the target sidelink feedback channel type used for the sidelink feedback. For another example, when the first terminal and the second terminal establish a connection, the first terminal and the second terminal may communicate configuration information with each other through the PC5-RRC signaling, and the first information may be carried in the configuration information and may be used to indicate a type of the PSFCH, or the first terminal and the second terminal can also update the type of the PSFCH by reconfiguring the PC5-RRC signaling.

In some embodiments, the network device sends the first information through a broadcast message or Radio Resource Control (RRC) signaling.

Specifically, when the first terminal and the second terminal are in a cell covered by the network device, the network device may send the first information to the first terminal and the second terminal to indicate the type of the PSFCH, for example, through the broadcast message such as a System Information Block (SIB), or the RRC signaling.

In some embodiments, the group header terminal sends the first information to the first terminal through the SCI or the PC5-RRC signaling, or in the multicast communication, the group header terminal may notify terminals in the communication group the type of the PSFCH used.

As another embodiment, if the number of bits of information to be fed back is 1 bit, the first terminal may determine that the target sidelink feedback channel type is the first-type sidelink feedback channel; or if the number of bits of the information to be fed back is a plurality of bits, the first terminal may determine that he target sidelink feedback channel type is the second-type sidelink feedback channel.

As still another embodiment, if the resource pool configuration of the at least one sidelink data channel is configured with only the transmission resource of the first-type sidelink feedback channel associated with the at least one sidelink data channel, it is determined the target sidelink feedback channel type is the first-type sidelink feedback channel; or, if the resource pool configuration of the at least one sidelink data channel is configured with the transmission resource of the second-type sidelink feedback channel associated with the at least one sidelink data channel, it is determined the target sidelink feedback channel type is the second-type sidelink feedback channel.

In the case where it is determined to use the first-type sidelink feedback channel, if the number of the at least one sidelink data channel is one, the first terminal may send to the second terminal one first-type sidelink feedback channel for carrying the feedback information of the one sidelink data channel. Alternatively, if the number of the at least one sidelink data channel is multiple, the first terminal may send to the second terminal multiple first-type sidelink feedback channels for carrying the feedback information of the multiple sidelink data channels.

In the case where it is determined to use the second-type sidelink feedback channel, the terminal device may carry the feedback information of the at least one sidelink data channel in one sidelink feedback channel for feedback, which is beneficial to reduce the feedback overhead.

In some embodiments, in some embodiments, the sidelink feedback information includes at least one of the following:
Hybrid Automatic Repeat reQuest-ACKnowledgement (HARQ-ACK);
Channel Quality Indicator (CQI);
Rank Indication (RI);
Precoding Matrix Indicator (PMI); and
index information for determining a beam.

The method embodiments of the present disclosure are described in detail above with reference to FIGS. 6 to 11, and device embodiments of the present disclosure are described in detail below in conjunction with FIGS. 12 to 15. It should be understood that the device embodiments and the method embodiments correspond to each other and similar description can refer to the method embodiments.

Figure 12:
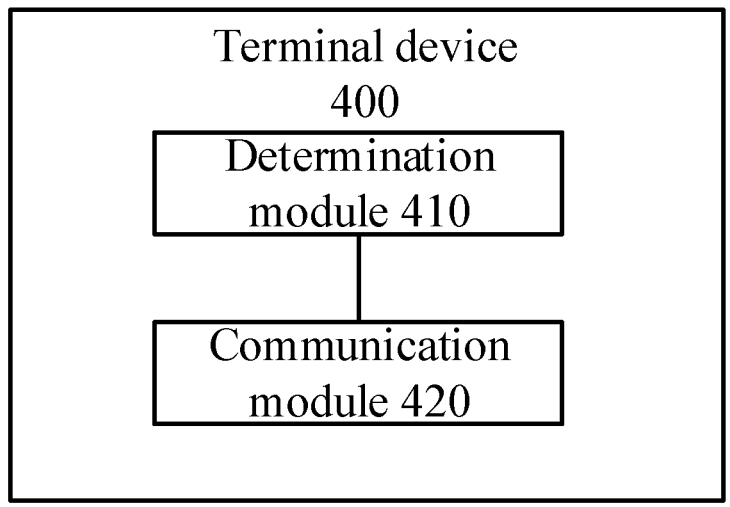
FIG. 12 is a schematic block diagram of a terminal device provided by an embodiment of the present disclosure.

FIG. 12 shows a schematic block diagram of a terminal device 400 according to an embodiment of the present disclosure. As shown in FIG. 12, the terminal device 400 includes:
a communication module 410, configured to receive a sidelink data channel and/or a sidelink reference signal sent by a second terminal;
a determination module 420, configured to determine a resource pool configuration and/or a transmission resource of a first sidelink feedback channel, where the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1; and
the communication module 410 is further configured to send the first sidelink feedback channel to the second terminal according to the resource pool configuration and/or the transmission resource of the first sidelink feedback channel.

In some embodiments, all time domain symbols that can be used for sidelink transmission in one slot are occupied by the second-type sidelink feedback channel in a time domain.

In some embodiments, the last time domain symbol in all the time domain symbols that can be used for the sidelink transmission in one slot is not used for transmission of the second-type sidelink feedback channel.

In some embodiments, M Physical Resource Blocks (PRBs) are occupied by the second-type sidelink feedback channel in a frequency domain, where M is a positive integer.

In some embodiments, the determining module 420 is specifically configured to:
determine the resource pool configuration of the first sidelink feedback channel according to configuration information of a network device or pre-configuration information.

In some embodiments, the resource pool configuration of the first sidelink feedback channel is used to determine at least one of the following:
a frequency domain starting position of a resource pool of the first sidelink feedback channel;
a frequency domain resource size of the resource pool of the first sidelink feedback channel;
the number of Physical Resource Blocks (PRBs) occupied by the first sidelink feedback channel;
a slot position of the resource pool of the first sidelink feedback channel;
a starting time domain symbol in each slot that can be used for transmitting the first sidelink feedback channel; and
the number of time domain symbols in each slot that can be used for transmitting the first sidelink feedback channel.

In some embodiments, the frequency domain starting position of the resource pool of the first sidelink feedback channel is indicated by a PRB index or a sub-band index.

In some embodiments, the frequency domain resource size of the resource pool of the first sidelink feedback channel is indicated by the number of occupied PRBs or the number of occupied sub-bands.

In some embodiments, a frequency domain resource of the resource pool of the first sidelink feedback channel is determined through a first bitmap, each bit in the first bitmap corresponds to one PRB or one sub-band, and each bit is used to indicate whether the corresponding PRB or sub-band is the frequency domain resource of the resource pool of the first sidelink feedback channel.

In some embodiments, the slot position of the resource pool of the first sidelink feedback channel is determined through a second bitmap, each bit in the second bitmap corresponds to one slot, and each bit is used to indicate whether the corresponding slot is a slot position that can be used for transmitting the first sidelink feedback channel.

In some embodiments, the determining module 420 is further configured to:
  determine the resource pool configuration of the first sidelink feedback channel according to a resource pool configuration of the sidelink data channel corresponding to the first sidelink feedback channel and/or a resource pool configuration of a first-type sidelink feedback channel, where the first-type sidelink feedback channel is used to carry 1-bit feedback information.

In some embodiments, the resource pool configuration of the first sidelink feedback channel is used to determine at least one of the following:
  a frequency domain starting position of the resource pool of the first sidelink feedback channel;
  a frequency domain resource size of the resource pool of the first sidelink feedback channel;
  the number of Physical Resource Blocks (PRBs) occupied by the first sidelink feedback channel;
  a slot position of the resource pool of the first sidelink feedback channel;
  a starting time domain symbol in each slot that can be used for transmitting the first sidelink feedback channel; and
  the number of time domain symbols in each slot that can be used for transmitting the first sidelink feedback channel.

In some embodiments, a slot occupied by the resource pool of the first sidelink feedback channel is the same as a slot occupied by the resource pool of the corresponding sidelink data channel.

In some embodiments, the resource pool of the first sidelink feedback channel and the resource pool of the corresponding sidelink data channel are frequency-division multiplexed.

In some embodiments, if one slot includes a time domain symbol for transmitting the first-type sidelink feedback channel, the time domain symbol for transmitting the first sidelink feedback channel does not include the time domain symbol for transmitting the first-type sidelink feedback channel.

In some embodiments, the time domain symbol that is used for transmitting the first sidelink feedback channel in one slot is the same as the time domain symbol of the sidelink data channel transmitted in this one slot.

In some embodiments, the frequency domain resource size of the resource pool of the first sidelink feedback channel is determined according to the number of sub-bands in the resource pool of the sidelink data channel.

In some embodiments, the frequency domain starting position of the resource pool of the first sidelink feedback channel is determined according to a frequency domain starting position of the resource pool of the sidelink data channel.

In some embodiments, the determining module 420 is further configured to:
  determine the transmission resource of the first sidelink feedback channel in the resource pool of the first sidelink feedback channel according to first SCI sent by the second terminal.

In some embodiments, the first SCI includes first indication information and/or second indication information, the first indication information is used to determine a slot position of the first sidelink feedback channel, and the second indication information is used to determine a frequency domain position of the first sidelink feedback channel.

In some embodiments, the first indication information is used to indicate a slot offset, and the slot offset is a slot offset of the first sidelink feedback channel with respect to a slot where the first SCI is located or a slot where the sidelink data channel is located; or
  the first indication information is used to indicate an index value, and the slot offset of the first sidelink feedback channel with respect to the first SCI or the sidelink data channel is determined according to the index value, and there is a correspondence between the index value and the slot offset.

In some embodiments, the second indication information is used to indicate an index value, and the index value is an index of a target frequency domain position in a plurality of frequency domain positions in the resource pool of the first sidelink feedback channel.

In some embodiments, the determining module 420 is further configured to:
  determine the transmission resource of the first sidelink feedback channel in the resource pool of the first sidelink feedback channel according to a transmission resources of the sidelink data channel.

In some embodiments, the determining module 420 is further configured to:
  determine the frequency domain position of the first sidelink feedback channel according to a frequency domain position of the sidelink data channel; and/or
  determine the slot position of the first sidelink feedback channel according to a slot position of the sidelink data channel.

In some embodiments, the determining module 420 is specifically configured to:
  determine the slot position of the first sidelink feedback channel according to the slot position of the sidelink data channel and a slot spacing, where the slot spacing is an interval of a slot for transmitting the first sidelink feedback channel with respect to a slot for transmitting the sidelink data channel.

In some embodiments, the determining module 420 is specifically configured to:
  determine the frequency domain position of the first sidelink feedback channel according to the frequency domain position of the sidelink data channel and a first correspondence, where the first correspondence is a correspondence between a frequency domain position of a sidelink feedback channel in the resource pool of the first sidelink feedback channel and a frequency domain position of a sidelink data channel in the resource pool of the sidelink data channel.

In some embodiments, the first sidelink feedback information is used to carry at least one of the following:
Hybrid Automatic Repeat reQuest-ACKnowledgement (HARQ-ACK);
Channel Quality Indicator (CQI);
Rank Indication (RI)
Precoding Matrix Indicator (PMI); and
index information for determining a beam.

In some embodiments, in some embodiments, the above-mentioned communication module may be a communication interface or a transceiver, or an input/output interface of a communication chip or a system-on-chip. The above determination module may be one or more processors.

It should be understood that the terminal device 400 according to the embodiments of the present disclosure may correspond to the terminal device in the method embodiments of the present disclosure, and the above-mentioned and other operations and/or functions of respective units in the terminal device 400 are respectively used to implement the corresponding processes of the first terminal in the method 200 illustrated in FIG. 6, which are not repeated herein for brevity.

Figure 13:
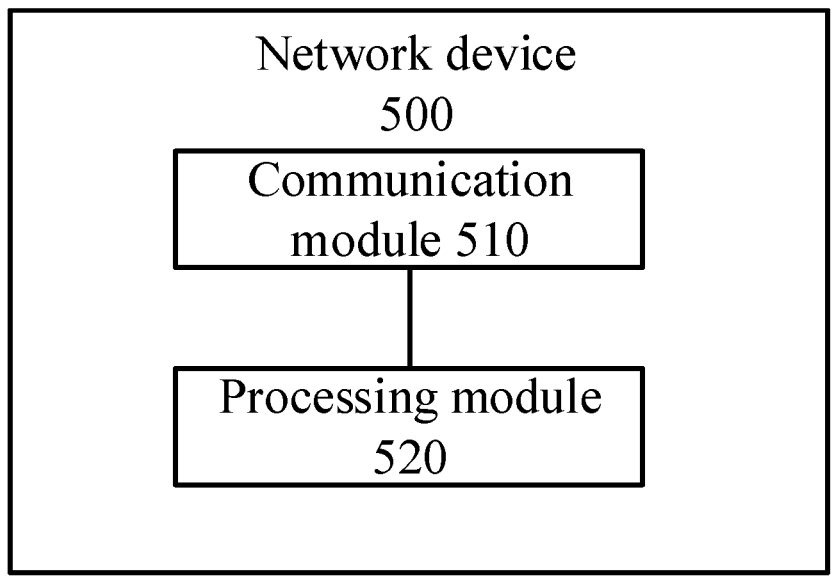
FIG. 13 is a schematic block diagram of another terminal device provided by an embodiment of the present disclosure.

FIG. 13 is a schematic block diagram of a terminal device according to an embodiment of the present disclosure. A terminal device 500 of FIG. 13 includes:
a communication module 510, configured to receive at least one sidelink data channel sent by a second terminal;
a determining module 520, configured to determine a target sidelink feedback channel type for transmission of sidelink feedback information of the at least one sidelink feedback channel from a plurality of sidelink feedback channel types, where the plurality of sidelink feedback channel types include a first-type sidelink feedback channel and a second-type sidelink feedback channel, the first-type sidelink feedback channel is used to carry 1-bit sidelink feedback information, and the second-type sidelink feedback channel is used to carry K-bit sidelink feedback information, where K is an integer greater than 1; and
the communication module 510 is further configured to send a sidelink feedback channel of the target sidelink feedback channel type to the second terminal.

In some embodiments, the determining module 520 is further configured to:
determine the target sidelink feedback channel type according to at least one of the number of bits of information to be fed back, a resource pool configuration and first information, where the first information is used to indicate a sidelink feedback channel type for transmission of the sidelink feedback information.

In some embodiments, the determining module 520 is specifically configured to:
determine the sidelink feedback channel type indicated by the first information as the target sidelink feedback channel type.

In some embodiments, the first information is sent by the second terminal to the first terminal; or
the first information is sent by a network device to the first terminal; or
the first information is sent by a group header terminal to the first terminal.

In some embodiments, the first information is sent by the second terminal to the first terminal through sidelink control information (SCI) or PC5-RRC signaling; or the first information is sent by the network device through a broadcast message or radio resource control (RRC) signaling; or
the first information is sent by the group header terminal to the first terminal through the SCI or the PC5-RRC signaling.

In some embodiments, the determining module 520 is further configured to:
determine that the target sidelink feedback channel type is the first-type sidelink feedback channel if the number of bits of the information to be fed back is 1 bit; or
determine that the target sidelink feedback channel type is the second-type sidelink feedback channel if the number of bits of the information to be fed back is a plurality of bits.

In some embodiments, the determining module 520 is further configured to:
determine that the target sidelink feedback channel type is the first-type sidelink feedback channel if a resource pool configuration of the at least one sidelink data channel is configured with only a transmission resource of the first-type sidelink feedback channel associated with the at least one sidelink data channel; or
determine that the target sidelink feedback channel type is the second-type sidelink feedback channel if the resource pool configuration of the at least one sidelink data channel is configured with a transmission resource of the second-type sidelink feedback channel associated with the at least one sidelink data channel.

In some embodiments, all time domain symbols that can be used for sidelink transmission in a slot are occupied by the second-type sidelink feedback channel in a time domain.

In some embodiments, the last time domain symbol in all the time domain symbols that can be used for the sidelink transmission in a slot is not used to transmit the second-type sidelink feedback channel.

In some embodiments, M Physical Resource Blocks (PRBs) are occupied by the second-type sidelink feedback channel in a frequency domain, where M is a positive integer.

In some embodiments, the sidelink feedback information includes at least one of the following:
Hybrid Automatic Repeat reQuest-ACKnowledgement (HARQ-ACK);
Channel Quality Indicator (CQI);
Rank Indication (RI);
Precoding Matrix Indicator (PMI); and
index information for determining a beam.

In some embodiments, in some embodiments, the above-mentioned communication module may be a communication interface or a transceiver, or an input/output interface of a communication chip or a system-on-chip. The above determination module may be one or more processors.

It should be understood that the terminal device 500 according to the embodiments of the present disclosure may correspond to the terminal device in the method embodiments of the present disclosure, and the above-mentioned and other operations and/or functions of respective units in the terminal device 500 are respectively used to implement the corresponding processes of the first terminal in the method 300 illustrated in FIG. 11, which are not repeated here for the sake of brevity.

Figure 14:
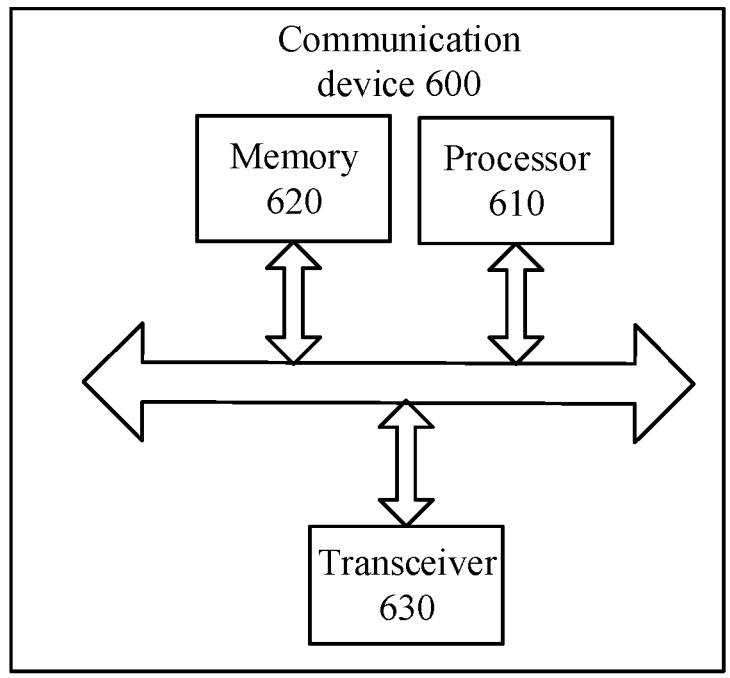
FIG. 14 is a schematic block diagram of a communication device provided by another embodiment of the present disclosure.

FIG. 14 is a schematic structural diagram of a communication device 600 according to an embodiment of the present disclosure. The communication device 600 shown in FIG. 14 includes a processor 610, and the processor 610 may invoke a computer program from a memory and run the computer program, to implement the methods in the embodiments of the present disclosure.

In some embodiments, as shown in FIG. 14, the communication device 600 may further include a memory 620. The processor 610 may invoke the computer program from the memory 620 and run the computer program, to implement the methods in the embodiments of the present disclosure.

The memory 620 may be a device independent of the processor 610, or may be integrated into the processor 610.

In some embodiments, as shown in FIG. 14, the communication device 600 may further include a transceiver 630, and the processor 610 may control the transceiver 630 to communicate with another device, and specifically, to transmit information or data to another device, or receive information or data transmitted by another device.

The transceiver 630 may include a transmitter and a receiver. The transceiver 630 may further include an antenna. There may be one or more antennas.

In some embodiments, the communication device 600 may specifically be the network device in the embodiments of the present disclosure, and the communication device 600 can implement corresponding processes implemented by the network device in various methods in the embodiments of the present disclosure, which are not described here again for the sake of brevity.

In some embodiments, the communication device 600 may specifically be the mobile terminal/terminal device in the embodiments of the present disclosure, and the communication device 600 can implement corresponding processes implemented by the mobile terminal/terminal device in various methods in the embodiments of the present disclosure, which are not described here again for the sake of brevity.

Figure 15:
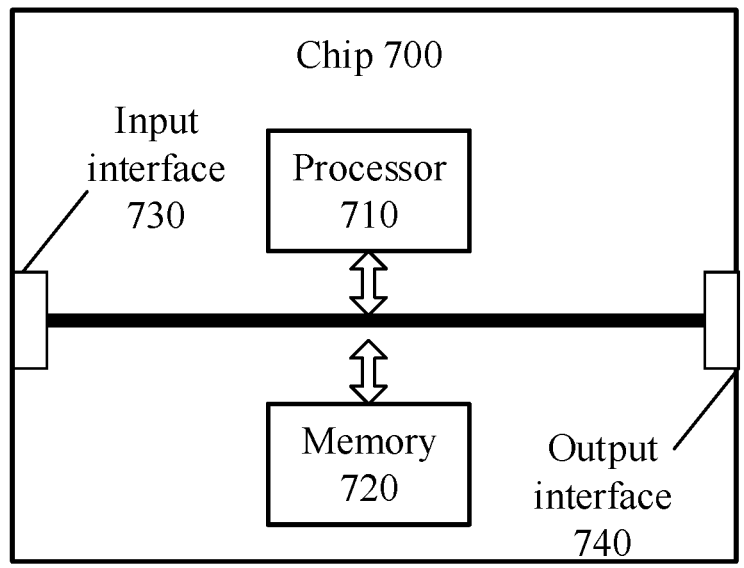
FIG. 15 is a schematic block diagram of a chip provided by an embodiment of the present disclosure.

FIG. 15 is a schematic structural diagram of a chip according to an embodiment of the present disclosure. The chip 700 shown in FIG. 15 includes a processor 710, and the processor 710 may invoke a computer program from a memory and run the computer program, to implement the methods in the embodiments of the present disclosure.

In some embodiments, as shown in FIG. 15, the chip 700 may further include a memory 720. The processor 710 may invoke the computer program from the memory 720 and run the computer program, to implement the methods in the embodiments of the present disclosure.

The memory 720 may be a device independent of the processor 710, or may be integrated into the processor 710.

In some embodiments, the chip 700 may further include an input interface 730. The processor 710 may control the input interface 730 to communicate with another device or chip, and specifically, to obtain information or data transmitted by another device or chip.

In some embodiments, the chip 700 may further include an output interface 740. The processor 710 may control the output interface 740 to communicate with another device or chip, and specifically, to output information or data to another device or chip.

In some embodiments, the chip may be applied to the network device in the embodiments of the present disclosure, and the chip can implement corresponding processes implemented by the network device in various methods in the embodiments of the present disclosure, which are not described here again for the sake of brevity.

In some embodiments, the chip may be applied to the mobile terminal/terminal device in the embodiments of the present disclosure, and the chip can implement corresponding processes implemented by the mobile terminal/terminal device in various methods in the embodiments of the present disclosure, which are not described here again for the sake of brevity.

It should be noted that, the chip mentioned in the embodiments of the present disclosure may also be referred to as a system-level chip, a system chip, a chip system, a system on chip, or the like.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the operations of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure further provides a computer readable storage medium configured to store a computer program.

In some embodiments, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

In some embodiments, the computer-readable storage medium can be applied to the mobile terminal/terminal device in the embodiments of the present disclosure, and the computer program causes the computer to perform the corresponding processes which are implemented by the mobile terminal/terminal device in the methods of the embodiments of the present disclosure, which will not be repeated here for the sake of brevity.

An embodiment of the present disclosure further provides a computer program product including computer program instructions.

In some embodiments, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

In some embodiments, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the present disclosure also provides a computer program.

In some embodiments, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

In some embodiments, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Based on the above technical solutions, the first terminal can receive the sidelink data channel and/or the sidelink reference channel sent by the second terminal, determine that the feedback information of multiple bits needs to be fed back, and further determine the resource pool configuration of the second-type sidelink feedback channel, and determine the transmission resource of the first sidelink feedback channel that carries the feedback information of the multiple bits according to the resource pool configuration, so that the first terminal can send the first sidelink feedback information to the second terminal on the transmission resource. That is, the feedback information of the multiple bits can be fed back through one sidelink feedback channel, which facilitates to reduce feedback overhead. Further, the second terminal can determine whether to perform data retransmission based on the sidelink feedback channel, thereby improving reliability of data transmission.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, comprising:
receiving, by a first terminal, a sidelink data channel and/or a sidelink reference signal sent by a second terminal;
determining, by the first terminal, a resource pool configuration and/or a transmission resource of a first sidelink feedback channel, wherein the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1; and
sending, by the first terminal, the first sidelink feedback channel to the second terminal according to the resource pool configuration and/or the transmission resource of the first sidelink feedback channel,
wherein the determining, by the first terminal, the resource pool configuration and/or the transmission resource of the first sidelink feedback channel comprises:
determining, by the first terminal according to first SCI sent by the second terminal, the transmission resource of the first sidelink feedback channel in the resource pool of the first sidelink feedback channel,
wherein the first SCI comprises first indication information and/or second indication information, the first indication information is used to determine a slot position of the first sidelink feedback channel, and the second indication information is used to determine a frequency domain position of the first sidelink feedback channel, or
the first indication information is used to indicate a slot offset, and the slot offset is a slot offset of the first sidelink feedback channel with respect to a slot where the first SCI is located or a slot where the sidelink data channel is located; or
the first indication information is used to indicate an index value, and the slot offset of the first sidelink feedback channel with respect to the first SCI or the sidelink data channel is determined according to the index value, wherein there is a correspondence between the index value and the slot offset, or
the second indication information is used to indicate an index value, and the index value is an index of a target frequency domain position in a plurality of frequency domain positions in the resource pool of the first sidelink feedback channel.

2. The method according to claim 1, wherein the second-type sidelink feedback channel occupies all time domain symbols in a slot that are available for sidelink transmission in a time domain.

3. The method according to claim 2, wherein the last time domain symbol in all the time domain symbols in the slot that are available for the sidelink transmission is not used to transmit the second-type sidelink feedback channel.

4. The method according to claim 1, wherein the second-type sidelink feedback channel occupies M Physical Resource Blocks (PRBs) in a frequency domain, M being a positive integer.

5. The method according to claim 1, wherein the determining, by the first terminal, the resource pool configuration and/or the transmission resource of the first sidelink feedback channel comprises:
determining the resource pool configuration of the first sidelink feedback channel according to configuration information of a network device or pre-configured information.

6. The method according to claim 5, wherein the resource pool configuration of the first sidelink feedback channel is used to determine at least one of the following:
a frequency domain starting position of a resource pool of the first sidelink feedback channel;
a frequency domain resource size of the resource pool of the first sidelink feedback channel;
the number of Physical Resource Blocks (PRBs) occupied by the first sidelink feedback channel;
a slot position of the resource pool of the first sidelink feedback channel;
a starting time domain symbol in each slot that is available for transmission of the first sidelink feedback channel; and
the number of time domain symbols in each slot that are available for transmission of the first sidelink feedback channel.

7. The method according to claim 6, wherein the frequency domain starting position of the resource pool of the first sidelink feedback channel is indicated by a PRB index or a sub-band index, or
wherein the frequency domain resource size of the resource pool of the first sidelink feedback channel is indicated by the number of occupied PRBs or the number of occupied sub-bands.

8. The method according to claim 6, wherein:
a frequency domain resource of the resource pool of the first sidelink feedback channel is determined through a first bitmap, wherein each bit in the first bitmap corresponds to one PRB or one sub-band, and each bit is used to indicate whether the corresponding PRB or sub-band is the frequency domain resource of the resource pool of the first sidelink feedback channel, or
the slot position of the resource pool of the first sidelink feedback channel is determined through a second bitmap, wherein each bit in the second bitmap corresponds to one slot, and each bit is used to indicate whether the corresponding slot is a slot position that is available for transmission of the first sidelink feedback channel.

9. The method according to claim 1, wherein the determining, by the first terminal, the resource pool configuration and/or the transmission resource of the first sidelink feedback channel comprises:
determining the resource pool configuration of the first sidelink feedback channel according to a resource pool configuration of the sidelink data channel corresponding to the first sidelink feedback channel and/or a resource pool configuration of a first-type sidelink feedback channel, wherein the first-type sidelink feedback channel is used to carry 1-bit feedback information.

10. The method according to claim 9, wherein the resource pool configuration of the first sidelink feedback channel is used to determine at least one of the following:
a frequency domain starting position of a resource pool of the first sidelink feedback channel;
a frequency domain resource size of the resource pool of the first sidelink feedback channel;

the number of Physical Resource Blocks (PRBs) occupied by the first sidelink feedback channel;
a slot position of the resource pool of the first sidelink feedback channel;
a starting time domain symbol in each slot that is available for transmission of the first sidelink feedback channel; and
the number of time domain symbols in each slot that are available for transmission of the first sidelink feedback channel.

11. The method according to claim 10, wherein a slot occupied by the resource pool of the first sidelink feedback channel is the same as a slot occupied by a resource pool of the corresponding sidelink data channel, or
wherein the resource pool of the first sidelink feedback channel and a resource pool of the corresponding sidelink data channel are frequency-division multiplexed.

12. The method according to claim 9, wherein if a slot comprises a time domain symbol for transmission of the first-type sidelink feedback channel, a time domain symbol for transmission of the first sidelink feedback channel does not comprise the time domain symbol for the transmission of the first-type sidelink feedback channel, or
wherein the time domain symbols in a slot that are used for transmission of the first sidelink feedback channel are the same as time domain symbols of a sidelink data channel transmitted in the slot,
wherein the frequency domain resource size of the resource pool of the first sidelink feedback channel is determined according to the number of sub-bands in the resource pool of the sidelink data channel, or
wherein the frequency domain starting position of the resource pool of the first sidelink feedback channel is determined according to a frequency domain starting position of the resource pool of the sidelink data channel.

13. The method according to claim 1, wherein the determining, by the first terminal, the resource pool configuration and/or the transmission resource of the first sidelink feedback channel comprises:
determining, by the first terminal according to a transmission resources of the sidelink data channel, the transmission resource of the first sidelink feedback channel in the resource pool of the first sidelink feedback channel,
wherein the determining, by the first terminal according to the transmission resources of the sidelink data channel, the transmission resource of the first sidelink feedback channel in the resource pool of the first sidelink feedback channel comprises:
determining, by the first terminal according to a frequency domain position of the sidelink data channel, the frequency domain position of the first sidelink feedback channel; and/or
determining, by the first terminal according to a slot position of the sidelink data channel, the slot position of the first sidelink feedback channel.

14. The method according to claim 13, wherein the determining, by the first terminal according to the slot position of the sidelink data channel, the slot position of the first sidelink feedback channel comprises:
determining the slot position of the first sidelink feedback channel according to the slot position of the sidelink data channel and a slot spacing, wherein the slot spacing is an interval of a slot for transmitting the first sidelink feedback channel with respect to a slot for transmitting the sidelink data channel,
wherein the determining, by the first terminal according to the frequency domain position of the sidelink data channel, the frequency domain position of the first sidelink feedback channel comprises:
determining the frequency domain position of the first sidelink feedback channel according to the frequency domain position of the sidelink data channel and a first correspondence, wherein the first correspondence is a correspondence between a frequency domain position of a sidelink feedback channel in the resource pool of the first sidelink feedback channel and a frequency domain position of a sidelink data channel in the resource pool of the sidelink data channel.

15. The method according to claim 1, wherein the first sidelink feedback information is used to carry at least one of the following:
Hybrid Automatic Repeat reQuest-ACKnowledgement (HARQ-ACK);
Channel Quality Indicator (CQI);
Rank Indication (RI);
Precoding Matrix Indicator (PMI); and
index information for determining a beam.

16. A wireless communication method, comprising:
receiving, by a first terminal, at least one sidelink data channel sent by a second terminal;
determining, by the first terminal, a target sidelink feedback channel type for transmission of sidelink feedback information of the at least one sidelink feedback channel from a plurality of sidelink feedback channel types, wherein the plurality of sidelink feedback channel types comprise a first-type sidelink feedback channel and a second-type sidelink feedback channel, the first-type sidelink feedback channel is used to carry 1-bit sidelink feedback information, and the second-type sidelink feedback channel is used to carry K-bit sidelink feedback information, where K is an integer greater than 1; and
sending, by the first terminal, a sidelink feedback channel of the target sidelink feedback channel type to the second terminal,
wherein the determining. by the first terminal, the target sidelink feedback channel type transmitting the sidelink feedback information of the at least one sidelink feedback channel from the plurality of sidelink feedback channel types comprises:
determining. by the first terminal, the target sidelink feedback channel type according to at least one of the number of bits of information to be fed back, a resource pool configuration and first information, wherein the first information is used to indicate a sidelink feedback channel type for transmission of the sidelink feedback information,
wherein the determining, by the first terminal, the target sidelink feedback channel type according to the at least one of the number of bits of the information to be fed back, the resource pool configuration and the first information comprises:
determining the sidelink feedback channel type indicated by the first information as the target sidelink feedback channel type.

17. A terminal device, comprising:
a transceiver;
a processor; and
a memory configured to store a computer program executable by the processor, wherein the transceiver is configured to receive a sidelink data channel and/or a sidelink reference signal sent by a second terminal;

the processor is configured to determine a resource pool configuration and/or a transmission resource of a first sidelink feedback channel, wherein the first sidelink feedback channel is a second-type sidelink feedback channel, the second-type sidelink feedback channel is used to carry sidelink feedback information of the sidelink data channel and/or a measurement result of the sidelink reference signal, and the number of bits of information carried in the second-type sidelink feedback channel is greater than 1; and the transceiver is further configured to send the first sidelink feedback channel to the second terminal according to the resource pool configuration and/or the transmission resource of the first sidelink feedback channel, wherein the processor is further configured to:

determine, according to first SCI sent by the second terminal, the transmission resource of the first sidelink feedback channel in the resource pool of the first sidelink feedback channel, wherein the first SCI comprises first indication information and/or second indication information, the first indication information is used to determine a slot position of the first sidelink feedback channel, and the second indication information is used to determine a frequency domain position of the first sidelink feedback channel, or the first indication information is used to indicate a slot offset, and the slot offset is a slot offset of the first sidelink feedback channel with respect to a slot where the first SCI is located or a slot where the sidelink data channel is located; or the first indication information is used to indicate an index value, and the slot offset of the first sidelink feedback channel with respect to the first SCI or the sidelink data channel is determined according to the index value, wherein there is a correspondence between the index value and the slot offset, or the second indication information is used to indicate an index value, and the index value is an index of a target frequency domain position in a plurality of frequency domain positions in the resource pool of the first sidelink feedback channel.

\* \* \* \* \*